(12) United States Patent
El Ferik et al.

(10) Patent No.: US 12,276,991 B2
(45) Date of Patent: Apr. 15, 2025

(54) DOUBLE PIPE HEAT EXCHANGER FOULING COMPENSATION

(71) Applicant: KING FAHD UNIVERSITY OF PETROLEUM AND MINERALS, Dhahran (SA)

(72) Inventors: Sami El Ferik, Dhahran (SA); Mustafa Al-Nasser, Al-Khobar (SA); Rached Ben Mansour, Dhahran (SA); Mohammed Ahmed Mohammed Eltoum, Dhahran (SA)

(73) Assignees: KING FAHD UNIVERSITY OF PETROLEUM AND MINERALS, Dhahran (SA); Yokogawa Saudi Arabia Company, Al-Khobar (SA)

( * ) Notice: Subject to any disclaimer, the term of this patent is extended or adjusted under 35 U.S.C. 154(b) by 625 days.

(21) Appl. No.: 17/550,444

(22) Filed: Dec. 14, 2021

(65) Prior Publication Data

US 2022/0187858 A1 Jun. 16, 2022

Related U.S. Application Data

(60) Provisional application No. 63/125,064, filed on Dec. 14, 2020.

(51) Int. Cl.
*F28D 7/00* (2006.01)
*G05B 15/02* (2006.01)
(Continued)

(52) U.S. Cl.
CPC ......... *G05D 23/1917* (2013.01); *G05B 15/02* (2013.01); *F28D 7/0008* (2013.01);
(Continued)

(58) Field of Classification Search
USPC .......................................................... 700/300
See application file for complete search history.

(56) References Cited

U.S. PATENT DOCUMENTS 5,822,740 A * 10/1998 Haissig .............. G05B 13/0275
706/5
8,164,735 B2 4/2012 Okada
(Continued)

FOREIGN PATENT DOCUMENTS

CN 106574545 B 11/2019

OTHER PUBLICATIONS

Omidi et al., "A comprehensive review on double pipe heat exchangers" Applied Thermal Engineering 110 (2017) pp. 1075-1090 (Year: 2017).*

(Continued)

*Primary Examiner* — Emilio J Saavedra
(74) *Attorney, Agent, or Firm* — Oblon, McClelland, Maier & Neustadt, L.L.P.

(57) ABSTRACT

This disclosure presents methods and systems of controlling a counter flow double pipe heat exchanger (DPHE) that includes a hot fluid pipe and a cold fluid pipe. In a method, a temperature error between a reference temperature and a temperature at an outlet of the hot fluid pipe of the counter flow DPHE is determined. A cold fluid mass flow rate is determined from an output of a proportional-integral-derivative (PID) controller based on the temperature error being input to the PID controller. The cold fluid mass flow rate is used for a cold fluid in the cold fluid pipe of the counter flow DPHE. The temperature error is controlled within a predefined range by utilizing parameters of the PID controller that are set by using a harmony search algorithm (HSA) to obtain a minimization of a cost function.

20 Claims, 21 Drawing Sheets

(51) Int. Cl.
  *G05D 23/19* (2006.01)
  *G06F 17/11* (2006.01)
  *G06F 119/08* (2020.01)
  *G06N 7/02* (2006.01)

(52) U.S. Cl.
  CPC .......... *G06F 17/11* (2013.01); *G06F 2119/08* (2020.01); *G06N 7/023* (2013.01)

(56) References Cited

U.S. PATENT DOCUMENTS

| 8,199,313 | B2 | 6/2012 | Okada |
| 8,452,459 | B2 | 5/2013 | Heavner |
| 2011/0054703 | A1* | 3/2011 | Heavner, III ........ B01D 1/0082 700/282 |

OTHER PUBLICATIONS

Turgut al., "Design and economic investigation of shell and tube heat exchangers using Improved Intelligent Tuned Harmony Search algorithm" Ain Shams Engineering Journal (2014) 5, 1215-1231 (Year: 2014).*

Fesanghary al., "Design optimization of shell and tube heat exchangers using global sensitivity analysis and harmony search algorithm" Applied Thermal Engineering 29 (2009) 1026-1031 (Year: 2009).*

Trafczynskiet al., "Tuning Parameters of PID Controllers for the Operation of Heat Exchangers under Fouling Conditions" Chemical Engineering Transactions • Dec. 2016 pp. 1237-1247 (Year: 2016).*

Heo, "Nonlinear control of high duty counter-current heat exchangers using reduced order model" Applied Thermal Engineering 157 (2019) 113720 8 pgs. (Year: 2019).*

\* cited by examiner

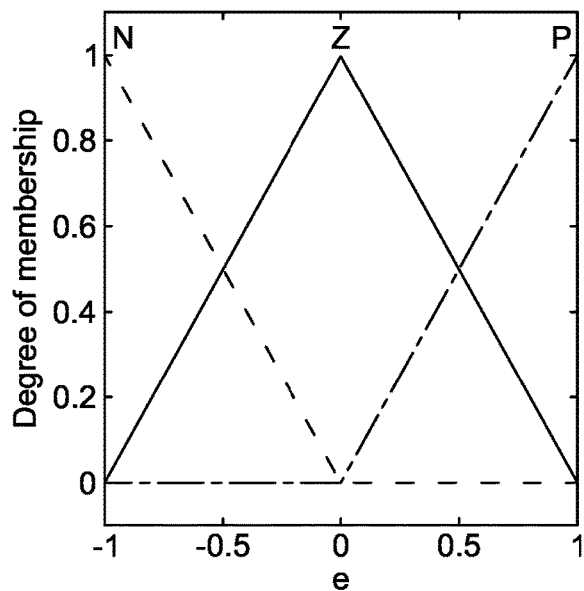
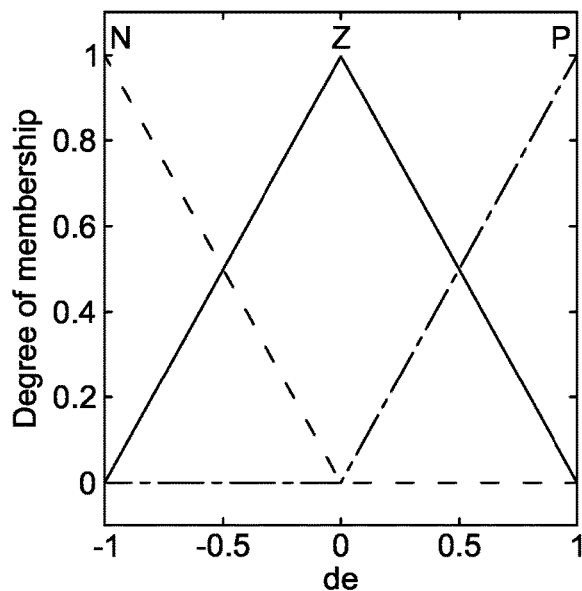
FIG. 9A      FIG. 9B
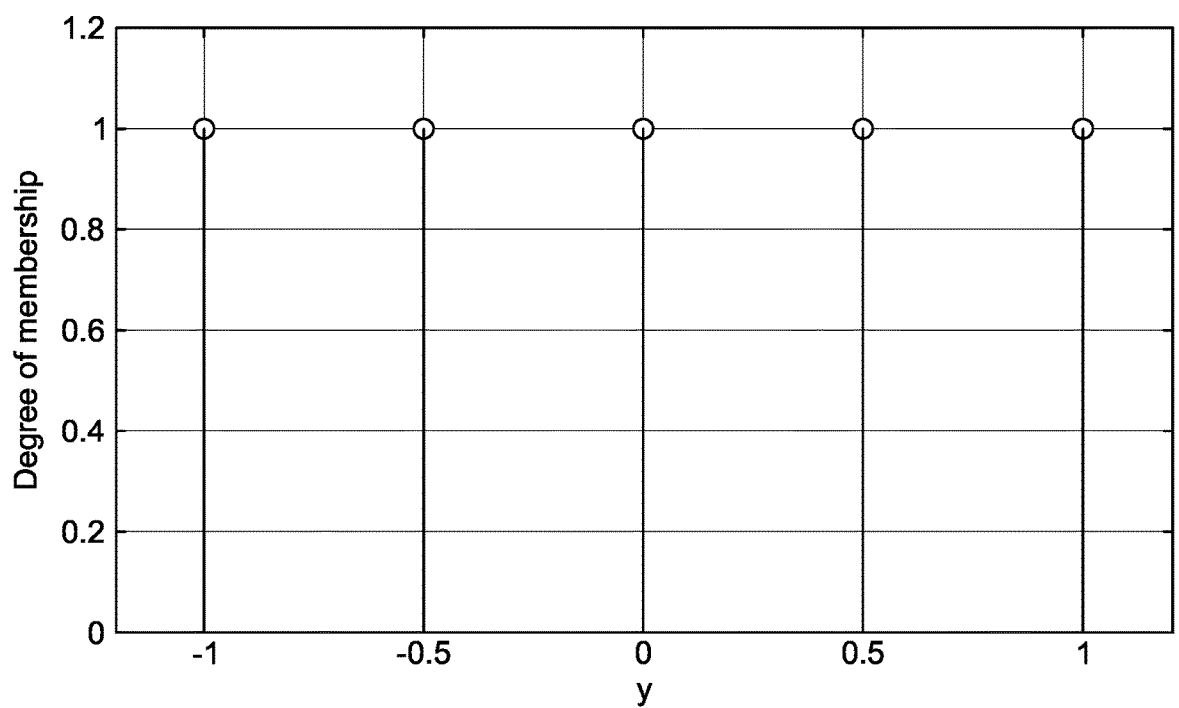
FIG. 10

DOUBLE PIPE HEAT EXCHANGER FOULING COMPENSATION

CROSS-REFERENCE TO RELATED APPLICATION

This present application claims the benefit of priority to U.S. Provisional Application No. 63/125,064, "DOUBLE PIPE HEAT EXCHANGER FOULING COMPENSATION," filed on Dec. 14, 2020, which is incorporated by reference herein in its entirety.

BACKGROUND

Technical Field

The present disclosure is directed to heat exchanging systems, and more particularly, to counter flow double pipe heat exchangers.

Description of Related Arts

The "background" description provided herein is for the purpose of generally presenting the context of the disclosure. Work of the presently named inventors, to the extent it is described in this background section, as well as aspects of the description which may not otherwise qualify as prior arts at the time of filing, are neither expressly or impliedly admitted as prior arts against the present disclosure.

A heat exchanger plays an essential role in a broad range of industrial applications where it facilitates heat transfer between two or multiple fluids. The heat exchanger enables the heat transfer process between two fluids with different temperatures without direct contact between them. The heat is transferred by convection between fluids and conduction between fluids and heat exchanger walls. A double pipe heat exchanger (DPHE) represents one of the common heat exchangers used widely due to its simplicity and applicability. This type of heat exchanger is broadly utilized in the food, oil and gas, and chemical industries. It is also of great significance when a wide range of temperature gradients is needed. Moreover, the DPHE has a high popularity in many small industries due to its simple design and low maintenance cost, as described by Omidi et al. in "A comprehensive review on double pipe heat exchangers," Appl. Therm. Eng., vol. 110, pp. 1075-1090, 2017.

The two primary arrangements of the heat exchangers based on flow direction are co-current and counter-current, where the latter is more efficient, as described by S. Heo in "Nonlinear control of high duty counter-current heat exchangers using reduced order model," Appl. Therm. Eng., vol. 157, 2019. Recently, the design and control of heat exchangers is a hot research domain wherein many studies have been conducted targeting different heat exchanger configurations, as described by S. Padhee in "Controller design for temperature control of heat exchanger system: Simulation studies," WSEAS Trans. Syst. Control, vol. 9, no. 1, pp. 485-491, 2014, by E. Aulisa et al. in "Velocity control of a counter-flow heat exchanger," IFAC-PapersOnLine, vol. 49, no. 18, pp. 104-109, 2016, and by J. Oravec et al. in "Robust model predictive control of a plate heat exchanger," Chem. Eng. Trans., vol. 70, pp. 25-30, 2018.

Fouling is an accumulation of undesired materials on an inner surface of a heat exchanger, producing a rise in thermal resistance of the heat exchanger, which, in turn, has a negative impact on the thermal efficiency of the heat exchanger. The foulant, which can either be an organic or inorganic material, usually has a poor thermal conductivity compared to the metallic wall conductivity, and thus results in a degradation of the heat transfer rate, as described by C. Borges De Carvalho et al. in "Dynamic analysis of fouling build-up in heat exchangers designed according to TEMA standards," Ind. Eng. Chem. Res., vol. 57, no. 10, pp. 3753-3764, 2018, by E. Diaz-Bejarano et al. in "Organic and inorganic fouling in heat exchangers: Industrial case study analysis of fouling rate," Ind. Eng. Chem. Res., vol. 58, no. 1, pp. 228-246, 2019, and by J. S. K. Ogbonnaya et al. in "Fouling phenomenon and its effect on heat exchanger: A review," Front. Heat Mass Transf., vol. 9, 2017.

A lot of research in the literature has been devoted to fouling estimation and prediction, which is useful for maintenance planning and can avoid unplanned shutdown to clean heat exchangers, as described by E. Diaz-Bejarano et al. in "Modeling and prediction of shell-side fouling in shell-and-tube heat exchangers," Heat Transf. Eng., vol. 40, no. 11, pp. 845-861, 2019, by E. Davoudi et al. in "Applying artificial neural networks for systematic estimation of degree of fouling in heat exchangers," Chem. Eng. Res. Des., vol. 130, pp. 138-153, 2018, by W. Al Hadad et al. in "Fouling detection in a shell and tube heat exchanger using variation of its thermal impulse responses: Methodological approach and numerical verification," Appl. Therm. Eng., pp. 612-619, 2019, by J. Wang et al. in "Fouling resistance prediction based on GA-Elman neural network for circulating cooling water with electromagnetic anti-fouling treatment," J. Energy Inst., 2018, by R. Smith et al. in "Fouling in heat exchanger networks," Chem. Eng. Trans., vol. 61, pp. 1789-1794, 2017, by Y. Wang et al. in "A review of experimental measurement and prediction models of crude oil fouling rate in crude refinery preheat trains," Asia-Pacific J. Chem. Eng., vol. 10, no. 4, pp. 607-625, 2015, and by E. Diaz-Bejarano et al. in "Detection of changes in fouling behavior by simultaneous monitoring of thermal and hydraulic performance of refinery heat exchangers," Comput. Aided Chem. Eng., vol. 37, pp. 1649-1654, 2015.

However, it is not always economically feasible to shut down the process in order to perform cleaning, which means that the heat exchanger may be required to operate under fouling conditions leading to higher operating costs. Therefore, online remedies to compensate for the impact of fouling accumulation on the thermal performance of the heat exchanger becomes inevitable. As described by Trafczynski et al. in "The influence of fouling on the dynamic behavior of PID-controlled heat exchangers," Appl. Therm. Eng., vol. 109, pp. 727-738, 2016, the influence of the fouling accumulation on the dynamic of a PID-controlled shell and tube heat exchanger was investigated. Results showed that the controller parameters need to be tuned periodically as the fouling resistance increases. Based on a similar model, as described by de Carolina et al. in "Tuning strategies for overcoming fouling effects in proportional integral derivative controlled heat exchangers," Ind. Eng. Chem. Res., vol. 57, no. 31, pp. 10518-10527, 2018, two strategies were presented for tuning a PID controller for a linearized shell and tube heat exchanger undergoing fouling. The first strategy is based on a built-in SIMULINK PID tuner. In contrast, the second one is based on sequential quadratic programming (SQP) algorithm, and it has been reported that the latter strategy has a better performance. Also, many advanced control schemes were investigated, such as model predictive control. As described by Oravec et al. in "Robust model predictive control and PID control of shell-and-tube heat exchangers," Energy, vol. 159, pp. 1-10, 2018, a robust model predictive controller (MPC) industrial shell and tube heat exchangers was designed, where the influence of the fouling is modeled as a parametric uncertainty. Most of these studies are conducted on shell and tube heat exchangers based on a linearized lumped model.

Many models describing the fouling build up process in the heat exchanger are been described in the literature. These modeling approaches can be split into three classes. In the first class, deterministic models are used which are derived from the first principles. In the second class, semi empirical models are used which are based on the first principles with unknown parameters estimated using parameter estimation techniques. The third class utilizes data-driven models for the fouling estimation, as described by C. Borges De Carvalho et al. in "Dynamic analysis of fouling buildup in heat exchangers designed according to TEMA standards," Ind. Eng. Chem. Res., vol. 57, no. 10, pp. 3753-3764, 2018. As described by D. Q. Kern et al. in "A theoretical analysis of thermal surface fouling.pdf," which Br. Chem. Eng., vol. 4, no. 5, pp. 258-262, 1959, a general paradigm is presented for the deterministic models where it quantifies the fouling rate as a tradeoff between deposits accumulation and removal rates. Based on this approach, many models have been developed, as described by W. Ebert et al. in "Analysis of exxon crude-oil-slip stream coking data," which was published on Fouling Mitig. Ind. heat Exch., pp. 18-23, 1995, by C. B. Panchal et al. in "Threshold conditions for crude oil fouling," Int. Conf. Underst. Heat Exch. Fouling and its Mitigation, pp. 273-282, 1999, and by M. R. Jafari Nasr et al. in "Modeling of crude oil fouling in preheat exchangers of refinery distillation units," Appl. Therm. Eng., vol. 26, no. 14-15, pp. 1572-1577, 2006. In addition, several semi empirical estimation techniques have been presented, for example, the extended Kalman filter as described by G. R. Jonsson et al. in "Use of extended Kalman filtering in detecting fouling in heat exchangers," Int. J. Heat Mass Transf., vol. 50, no. 13-14, pp. 2643-2655, 2007, the fuzzy observer as described by S. Delrot et al. in "Fouling detection in a heat exchanger by observer of Takagi-Sugeno type for systems with unknown polynomial inputs," Eng. Appl. Artif. Intell., vol. 25, no. 8, pp. 1558-1566, 2012., and the lock-in technique as described by S. Lalot et al. in "The lock-in technique applied to heat exchangers: A semi-analytical approach and its application to fouling detection," Appl. Therm. Eng., vol. 114, pp. 154-162, 2017. However, these models have a significant shortcoming in dealing with the fouling complexity.

Data driven models that are based on artificial neural networks (ANN) have gained a remarkable momentum due to their capability in tackling the complex systems that experience nonlinear patterns such as the fouling phenomenon. The ANN based models have been successfully applied to several problems in a diverse range of systems including wind energy systems as described by R. Ata in "Artificial neural networks applications in wind energy systems: A review," Renew. Sustain. Energy Rev., vol. 49, pp. 534-562, 2015, solar photovoltaic systems as described by A. Mellit et al. in "Artificial intelligence techniques for photovoltaic applications: A review," Prog. Energy Combust. Sci., vol. 34, no. 5, pp. 574-632, 2008, and steam boilers modeling as described by W. S. Henryk Rusinowski in "Neural modelling of steam boilers," Energy Conyers. Manag., vol. 48, no. 11, pp. 2802-2809, 2007. Moreover, the ANN is a powerful technique for predicting process parameters such as the parameters in the fouling phenomenon so that the cleaning process can be scheduled before the fouling reaches a severe level.

SUMMARY

This disclosure presents two methods of controlling a counter flow double pipe heat exchanger (DPHE) that includes a hot fluid pipe and a cold fluid pipe.

In a first method, a temperature error between a reference temperature and a temperature at an outlet of the hot fluid pipe of the counter flow DPHE is determined. A cold fluid mass flow rate is determined from an output of a proportional-integral-derivative (PID) controller based on the temperature error being input to the PID controller. The cold fluid mass flow rate is used for a cold fluid in the cold fluid pipe of the counter flow DPHE. The temperature error is controlled within a predefined range by utilizing parameters of the PID controller that are set by using a harmony search algorithm (HSA) to obtain a minimization of a cost function.

In a second method, a temperature error between a reference temperature and a temperature at an outlet of the hot fluid pipe of the counter flow DPHE is determined. A change rate of the temperature error is determined. A cold fluid mass flow rate is determined from an output of a fuzzy logic controller based on the temperature error and the change rate of the temperature error being input to the fuzzy logic controller. The cold fluid mass flow rate is used for a cold fluid in the cold fluid pipe of the counter flow DPHE. The temperature is controlled within a predefined range by utilizing parameters of the fuzzy logic controller that are set based on a minimization of a cost function.

This disclosure presents two heat exchanging systems.

A first heat exchanging system includes a counter flow DPHE and a PID controller. The counter flow DPHE performs a heat exchanging process between a hot fluid in a hot fluid pipe and a cold fluid in a cold fluid pipe. The PID controller receives a temperature error between a reference temperature and a temperature at an outlet of the hot fluid pipe of the counter flow DPHE, and outputs a cold fluid mass flow rate for the cold fluid in the cold fluid pipe of the counter flow DPHE based on the received temperature error. The temperature error is controller within a predefined range by utilizing parameters of the PID controller that are set by using an HSA to obtain a minimization of a cost function.

A second heat exchanging system includes a counter flow DPHE and a fuzzy logic controller. The counter flow DPHE performs a heat exchanging process between a hot fluid in a hot fluid pipe and a cold fluid in a cold fluid pipe. The fuzzy logic controller receives (i) a temperature error between a reference temperature and a temperature at an outlet of the hot fluid pipe of the counter flow DPHE and (ii) a change rate of the temperature error, and outputs a cold fluid mass flow rate for the cold fluid in the cold fluid pipe of the counter flow DPHE. The temperature error is controlled within a predefined range by utilizing parameters of the fuzzy logic controller that are set based on a minimization of a cost function.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 9A-9B show the membership functions for the inputs of the fuzzy controller according to some embodiments of the disclosure;

FIG. 10 shows the membership functions for the output of the fuzzy controller according to some embodiments of the disclosure;

DETAILED DESCRIPTION

Figure 1:
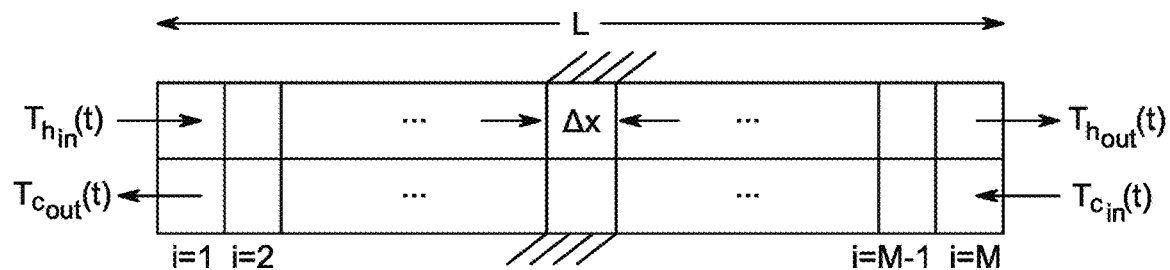
FIG. 1 shows a simplified counter flow double pipe heat exchanger (DPHE) according to some embodiments of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Aspects of this disclosure are directed to systems, devices, and methods for controlling a counter flow double pipe heat exchanger (DPHE). Two control schemes are included in the disclosure. The first one is a proportional-integral-derivative (PID) controller utilizing a harmony search metaheuristic algorithm developed to control an inner pipe fluid outlet temperature of a counter-flow heat exchanger undergoing fouling. The second control scheme is a fuzzy PID (FPID)

controller to control the inner pipe fluid outlet temperature of the counter-flow heat exchanger undergoing fouling.

1. Modelling of the Counter Flow DPHE

FIG. 1 shows a simplified counter flow DPHE according to some embodiments of the disclosure. A one-dimensional finite-difference analysis can be applied to the counter flow DPHE. In the one-dimensional finite-difference analysis, the DPHE is partitioned into multiple partitions along the pipe length of the DPHE. In FIG. 1, $T_{h_{in(t)}}$ is the hot side inlet temperature, $T_{h_{out(t)}}$ is the hot side outlet temperature, $T_{C_{in(t)}}$ is the cold side inlet temperature, $T_{C_{out(t)}}$ is the cold side outlet temperature, L is a length of pipe, M is the number of the partitions, Δx is a length of each partition, and i is a spatial index.

Figure 2:
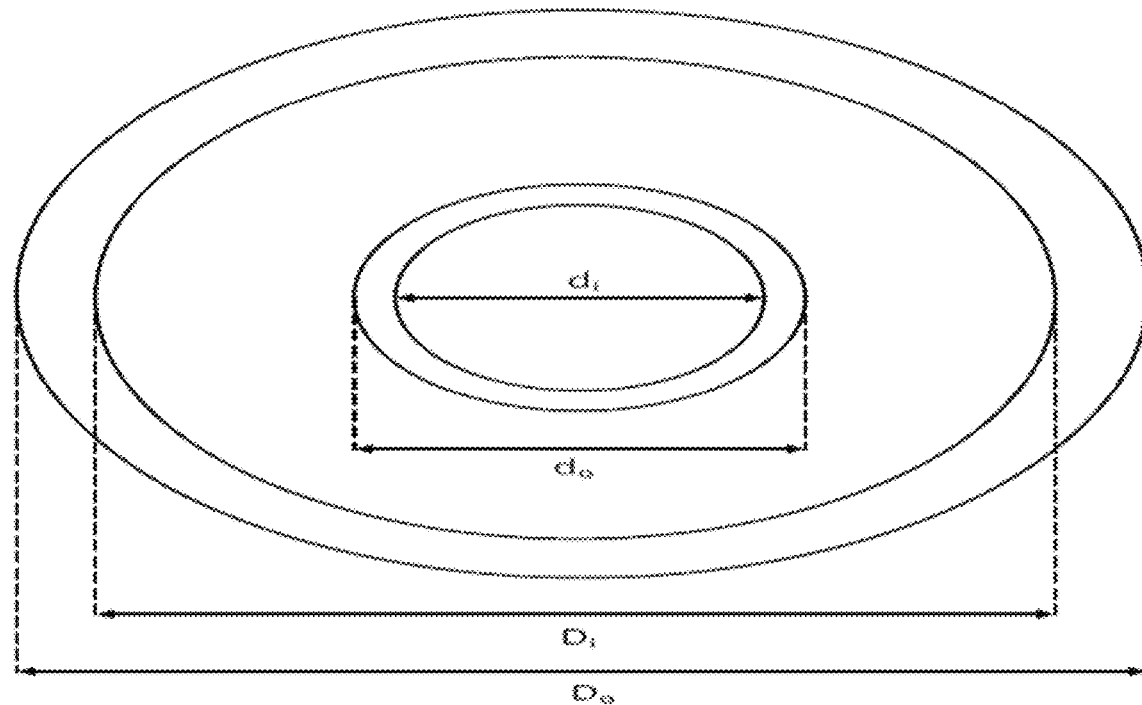
FIG. 2 shows a cross section view of the counter flow DPHE according to some embodiments of the disclosure.

FIG. 2 shows a cross section view of the counter flow DPHE according to some embodiments of the disclosure. In FIG. 2, $d_i$ is the inner diameter of the inner pipe, $d_o$ is the outer diameter of the inner pipe, $D_i$ is the inner diameter of the outer pipe, and $D_o$ is the outer diameter of the outer pipe.

Based on the one-dimensional finite-difference analysis of the counter flow DPHE, a dynamic DPHE model can be derived. The following assumptions can be used for the model derivations:
(1) The heat transfer coefficient is uniform along the pipe length;
(2) The wall temperature is considered negligible;
(3) The density and heat capacity of hot and cold fluids are constants; and
(4) The hot and cold fluids are both in a liquid phase.

As described by F. P. Incropera et al. in "Fundamentals of heat and mass transfer," John Wiley & Sons, 2011, the first law of the thermodynamic (conservation of energy) can be expressed as, $$\dot{E}_{in} - \dot{E}_{out} = \dot{E}_{st} = \rho C_P V \frac{\partial T}{\partial t} \quad (1)$$

where $\dot{E}_{in}$ and $\dot{E}_{out}$ denote the energy transfer rates into and out of the heat exchanger, respectively. The rate of the energy change of the system is represented by $\dot{E}_{st}$.

In some embodiments, it is assumed that the hot fluid flows through the inner pipe and the cold fluid flows through the outer pipe of the heat exchanger, equation (1) can be rewritten as follows:

$$\rho_h C_{P_h} \Delta V_1 \frac{\partial T_h(t, i)}{\partial t} = \quad (2)$$
$$\dot{m}_h C_{P_h}(T_h(t, i-1) - T_h(t, i)) - U(t)\Delta A_s(i)(T_h(t, i) - T_c(t, i))$$

$$\rho_c C_{P_c} \Delta V_2 \frac{\partial T_c(t, i)}{\partial t} = \quad (3)$$
$$\dot{m}_c C_{P_c}(T_c(t, i-1) - T_c(t, i)) + U(t)\Delta A_s(i)(T_h(t, i) - T_c(t, i))$$

where $\dot{m}_h$ is the hot fluid mass flow rate (Kg/sec), $\dot{m}_c$ is the cold fluid mass flow rate (Kg/sec), $\rho_h$ is the hot fluid density (Kg/m³), $\rho_c$ is the cold fluid density (Kg/m³), U(t) is the overall heat coefficient (W/m²·K), $\Delta A_s$ is the change in the surface area (m²), $\Delta V_1$ is the change in the inner pipe volume (m³), $\Delta V_2$ is the change in the outer pipe volume (m³), Δt is the time step (sec), $C_{P_h}$ is the specific heat at a constant pressure of the hot fluid, and $C_{P_c}$ is the specific heat at a constant pressure of the cold fluid.

By using explicit discretization and using an upwind scheme for the convective terms, the following equations can be obtained:

$$\frac{T_h(i, t+\Delta t) - T_h(i, t)}{\Delta t} = \quad (4)$$
$$\frac{\dot{m}_h C_{P_h}(T_h(t, i-1) - T_h(t, i)) - U(t)\Delta A_s(i)(T_h(t, i) - T_c(t, i))}{\rho_h C_{P_h} \Delta V_1}$$

$$\frac{T_c(i, t+\Delta t) - T_c(i, t)}{\Delta t} = \quad (5)$$
$$\frac{\dot{m}_c C_{P_c}(T_c(t, i-1) - T_c(t, i)) + U(t)\Delta A_s(i)(T_h(t, i) - T_c(t, i))}{\rho_c C_{P_c} \Delta V_2}$$

After some arrangements, Equations (4) and (5) can be written as follows:

$$T_h(i, t+\Delta t) = T_h(i, t) + \frac{\Delta t(\dot{m}_h C_{P_h}(T_h(t, i-1) - T_h(t, i)) - U(t)\Delta A_s(i)(T_h(t, i) - T_c(t, i)))}{\rho_c C_{P_c} \Delta V_1} \quad (6)$$

$$T_c(i, t+\Delta t) = T_c(i, t) + \frac{\Delta t(\dot{m}_c C_{P_c}(T_c(t, i-1) - T_c(t, i)) + U(t)\Delta A_s(i)(T_h(t, i) - T_c(t, i)))}{\rho_c C_{P_c} \Delta V_2} \quad (7)$$

$$\text{where } \Delta A_s = \pi d_o \Delta x, \Delta V_1 = \frac{\pi d_o^2}{4}\Delta x, \text{ and } \Delta V_2 = \frac{\pi D_i^2}{4}\Delta x \quad (8)$$

In some embodiments, the fouling has been considered for the inner pipe only while the outer pipe fouling is neglected. The thermal effect of the fouling on the heat transfer coefficient can be represented as follows:

$$U_f(t) = \frac{U_c(t)}{1 + U_c R_f} \quad (9)$$

where $U_f$ is the heat transfer coefficient under fouling conditions, $U_c$ is the heat transfer coefficient in the clean state, and $R_f$ is the fouling resistance.

Figure 3:
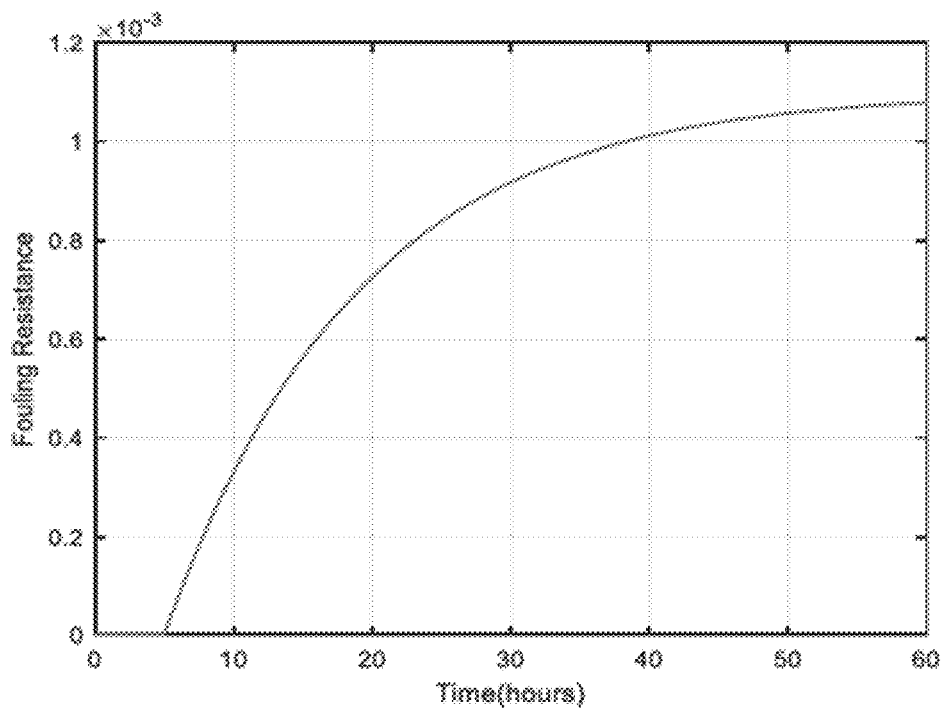
FIG. 3 shows an inner pipe fouling build-up pattern of the counter flow DPHE according to some embodiments of the disclosure.
Figure 4:
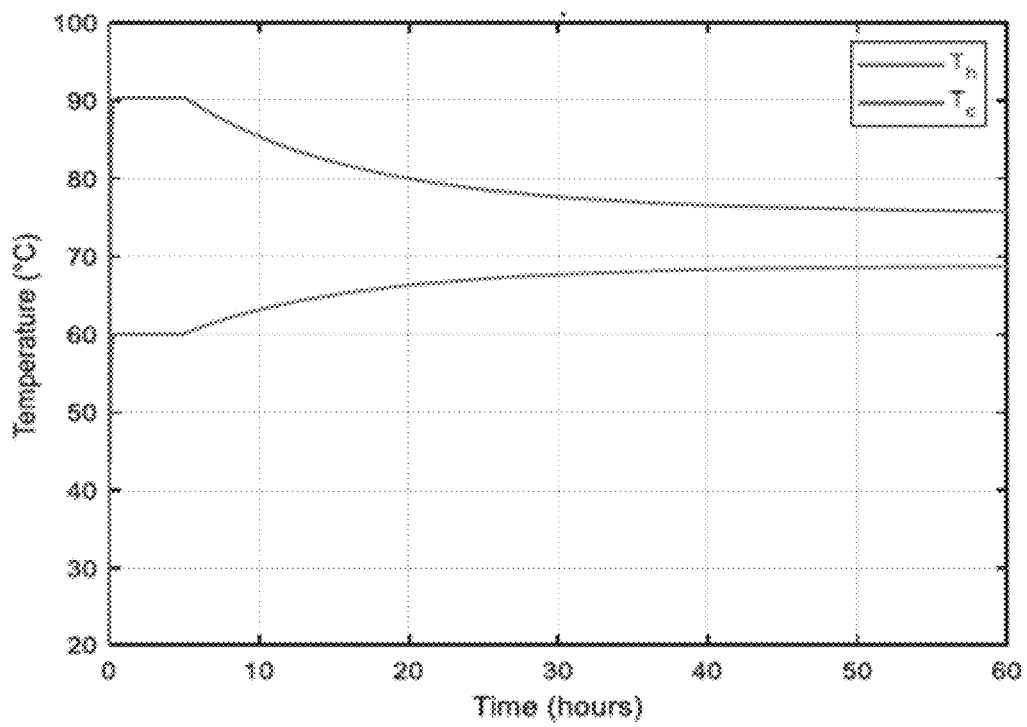
FIG. 4 shows an open-loop response of the counter flow DPHE according to some embodiments of the disclosure.

FIG. 3 shows an inner pipe fouling build-up pattern according to some embodiments of the disclosure. Given the fouling regime shown in FIG. 3, a resultant open-loop response is illustrated in FIG. 4 according to some embodiments of the disclosure.

Table 1 shows the DPHE parameters used for the system simulation according to some embodiments of the disclosure.

TABLE 1

| | |
|---|---|
| Hot fluid mass flow rate ($\dot{m}_h$) | 0.1 Kg/sec |
| Cold fluid mass flow rate ($\dot{m}_c$) | 0.0552 Kg/sec |
| Specific heat at a constant pressure of hot fluid ($C_{ph}$) | 4180 J/Kg · K |
| Specific heat at a constant pressure of cold fluid ($C_{pc}$) | 4180 J/Kg · K |
| Hot fluid density ($\rho_h$) | 1000 Kg/m³ |
| Cold fluid density ($\rho_c$) | 1000 Kg/m³ |
| Length of pipe | 5 m |
| Overall heat coefficient (U) | 1000 W/m² · K |
| Number of segments (M) | 50 |
| Time step | 0.01 sec |
| Hot side inlet temperature | 100° C. |
| Cold side inlet temperature | 20° C. |
| Inner diameter of the inner pipe ($d_i$) | 0.04 m |

TABLE 1-continued

| | |
|---|---|
| Outer diameter of the inner pipe ($d_o$) | 0.05 m |
| Inner diameter of the outer pipe ($D_i$) | 0.1 m |

2. Control Design

In this disclosure, two feedback control schemes have been employed to perform the fouling compensation based on the presented numerical model of the counter flow DPHE. In a first control scheme, a PID controller utilizing a harmony search metaheuristic algorithm is used to control the cold fluid flow rate of the counter flow DPHE based on temperature error between a reference temperature and a hot side outlet temperature (e.g., $T_{h_{out(t)}}$ in FIG. 1) of the counter flow DPHE. In a second control scheme, a fuzzy PID (FPID) controller is adopted to control the cold fluid flow rate of the counter DPHE based on the temperature error between the reference temperature and the hot side outlet temperature (e.g., $T_{h_{out(t)}}$ in FIG. 1) of the counter flow DPHE and a change rate of the temperature error.

2.1. PID Parameters Using Harmony Search Algorithm

The PID controller is known for its simplicity, ease of realization, and functionality, so it has been extensively used in various industrial systems, as described by K. H. Ang et al. in "PID control system analysis, design, and technology," IEEE Trans. Control Syst. Technol., vol. 13, no. 4, pp. 559-576, 2005. Several Model-based and model-free tuning methods have been developed to tune the PID controller, as described by K. Ogata et al. in "Modern control engineering," 5th ed., vol. 5, Prentice Hall Upper Saddle River, 2010. However, these tuning strategies might not lead to an optimal performance, especially when the controlled plant is nonlinear.

Based on the above presented discrete-time model of the DPHE, a discrete PID controller has been utilized to manipulate the cold fluid mass flow rate according to the desired hot fluid outlet temperature (e.g., the reference temperature). A mathematical formula for the discrete-time PID controller is given by:

$$u_t = \left(k_p + k_i \frac{T_s}{1-z^{-1}} + k_d \frac{1}{T_s}(1-z^{-1})\right)e_t \quad (10)$$

where $u_t$ is the output of the PID controller, $k_p$ is the proportional gain, $k_d$ is the derivative gain, $k_i$ is the integral gain, e denotes the error, $T_s$ represents the sampling time, and $z^{-1}$ is a backward shift operator, as described by E. M. Shaban et al. in "A novel discrete PID+ controller applied to higher order/time delayed nonlinear systems with practical implementation," Int. J. Dyn. Control, vol. 7, no. 3, pp. 888-900, 2019.

Figure 5:
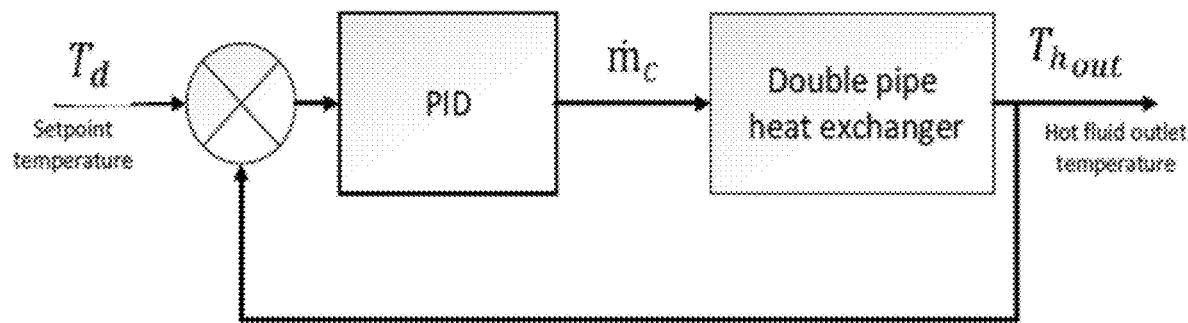
FIG. 5 shows an exemplary block diagram of a proportional-integral-derivative (PID) controlled counter flow DPHE system according to some embodiments of the disclosure.

FIG. 5 illustrates a block diagram of the PID-controlled counter flow DPHE according to some embodiments of the disclosure.

As described by Z. W. Geem et al. in "A new heuristic optimization algorithm: Harmony search," Simulation, vol. 76, no. 2, pp. 60-68, 2001, the harmony search algorithm (HSA) is a musically inspired meta-heuristic algorithm. The HSA is similar to music improvisation. A harmony memory (HM) is a location where the HSA saves a solution set. A new harmony in the HSA can be chosen from the HM or from the HM with slight adjustments, or it can be selected at random within the possible solution zone, as described by Z. W. Geem in "Music-inspired harmony search algorithm," which was published on vol. 191, no. 1. 2009, and by T. Zhang et al. in "Review of harmony search with respect to algorithm structure," Swarm Evol. Comput., vol. 48, pp. 31-43, 2019. Pitch adjusting rate (PAR) and harmony memory considering rate (HMCR) are two parameters that guide the selection process. PAR∈[0,1], which represents a slight adjustment to the past value in the HM, is given by:

$$x_{new} = x_{old} + FW \cdot \epsilon \quad (11)$$

where $x_{new}$ represents the adjusted pitch, $x_{old}$ denotes the current solution or pitch, FW is a fret width, and $\epsilon \in [0,1]$ is a random number.

HMCR $\in [0,1]$ represents a likelihood of selecting a proposed solution from among the current members of the HM. Picking up tiny HMCR values for the harmony can result in a slow convergence for the selection process. On the other hand, picking up high HMCR values (around 1) can result in a faster convergence but may compromise algorithm exploration capabilities.

Figure 6:
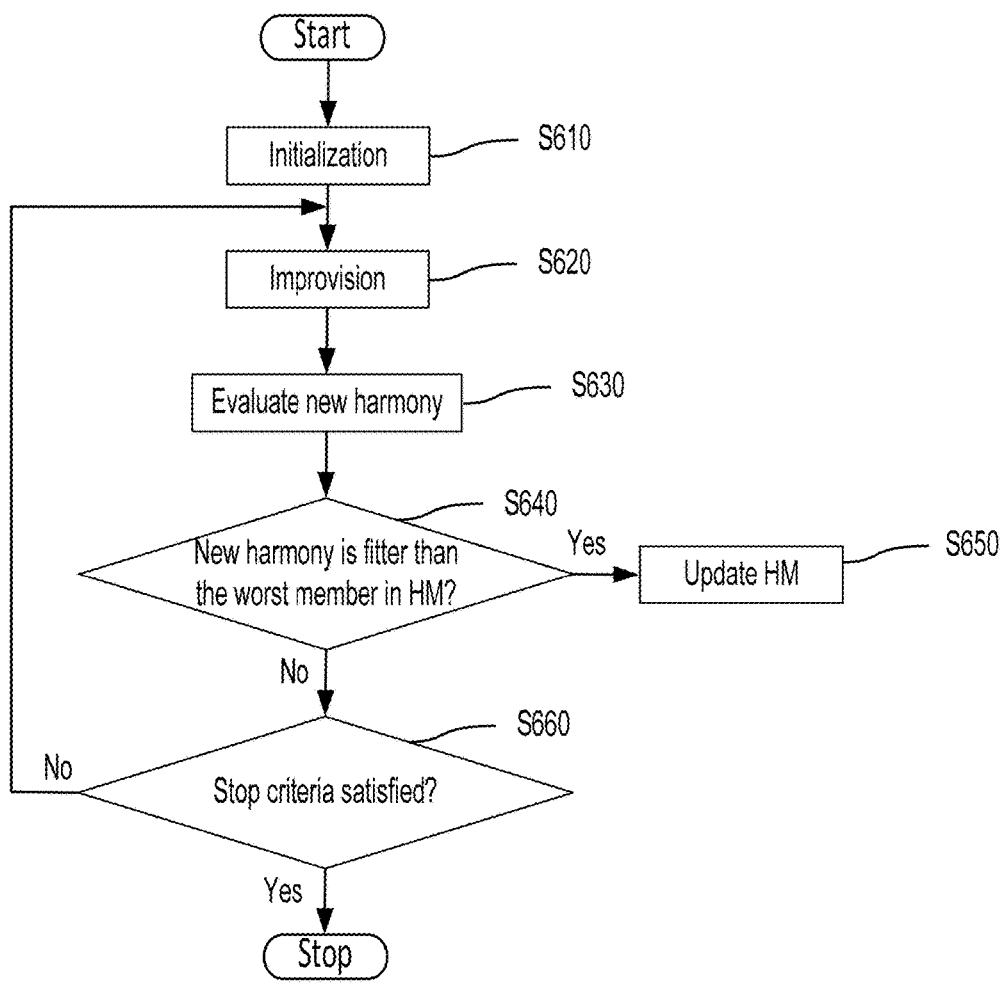
FIG. 6 shows a flowchart of a harmony search algorithm (HSA) according to some embodiments of the disclosure.

FIG. 6 shows a flowchart of the HSA according to some embodiments of the disclosure. As described by T. Zhang et al. in "Review of harmony search with respect to algorithm structure," Swarm Evol. Comput., vol. 48, pp. 31-43, 2019, and by K. S. Lee et al. in "A new meta-heuristic algorithm for continuous engineering optimization: Harmony search theory and practice," Comput. Methods Appl. Mech. Eng., vol. 194, no. 36-38, pp. 3902-3933, 2005, the procedure of the HSA includes the following steps:

Step S610: Harmony memory initialization, where initial candidate solutions in the HM are produced randomly. An HM with a size of HMS can be implemented as:

$$HM = \begin{bmatrix} x_1^1 & x_2^1 & & x_n^1 \\ x_1^2 & x_2^2 & \cdots & x_n^2 \\ \vdots & & \ddots & \vdots \\ x_1^{HMS} & x_2^{HMS} & \cdots & x_n^{HMS} \end{bmatrix} \quad (12)$$

where $[x_1^i, x_2^i, \ldots, x_n^i]$ are the candidate solutions (i=1, 2, ..., HMS).

Step S620: Improvise a new harmony from the HM in accordance with the HMCR and PAR.

Step S630: Evaluate the new harmony.

Step S640: Compare the new harmony value with the worst harmony value stored in the HM. If the new harmony value fits better, proceed to step S650; otherwise, the new harmony will be removed.

Step S650: Update the HM by replacing the worst harmony with the new harmony.

Step S660: Determine whether the termination criteria are satisfied. If not, return to step S620.

The implemented algorithm is inspired by the original HSA approach. However, instead of producing only one harmony per improvisation, multiple harmonics are created to improve the convergence rate, as described by Y. Cheng et al. in "An improved harmony search minimization algorithm using different slip surface generation methods for slope stability analysis," Eng. Optim., vol. 40, no. 2, pp. 95-115, 2008. In addition, as described by M. Mahdavi et al. in "An improved harmony search algorithm for solving optimization problems," Appl. Math. Comput., vol. 188, no. 2, pp. 1567-1579, 2007, a variable FW has been applied as follows, $$FW(i) = FW_{max} \exp\left(\ln\left(\frac{FW_{min}}{FW_{max}}\right) * \frac{i}{NI}\right) \quad (13)$$

where $FW_{max}$ indicates the maximum fret width, $FW_{min}$ indicates the minimum fret width, NI is the total generations number, and i is the current generation number. Initially, FW has a high value for improving global search capacity. To increase local search capabilities, FW steadily declines as i increases.

2.2. Fuzzy-PID Controller

The fuzzy logic control is one of the successful applications of fuzzy set theory, which, unlike crisp sets, allows partial membership (i.e., an element can be in part a member of more than a single set at the same time). The fuzzy logic receives an input vector and maps it into an output vector using linguistic statements in a form of If-Then rules attained from utilizing human knowledge about the system, as described by K. M. Passino and S. Yurkovich in "Fuzzy control", Vol. 42, Addison Wesley, 1998.

Figure 7:
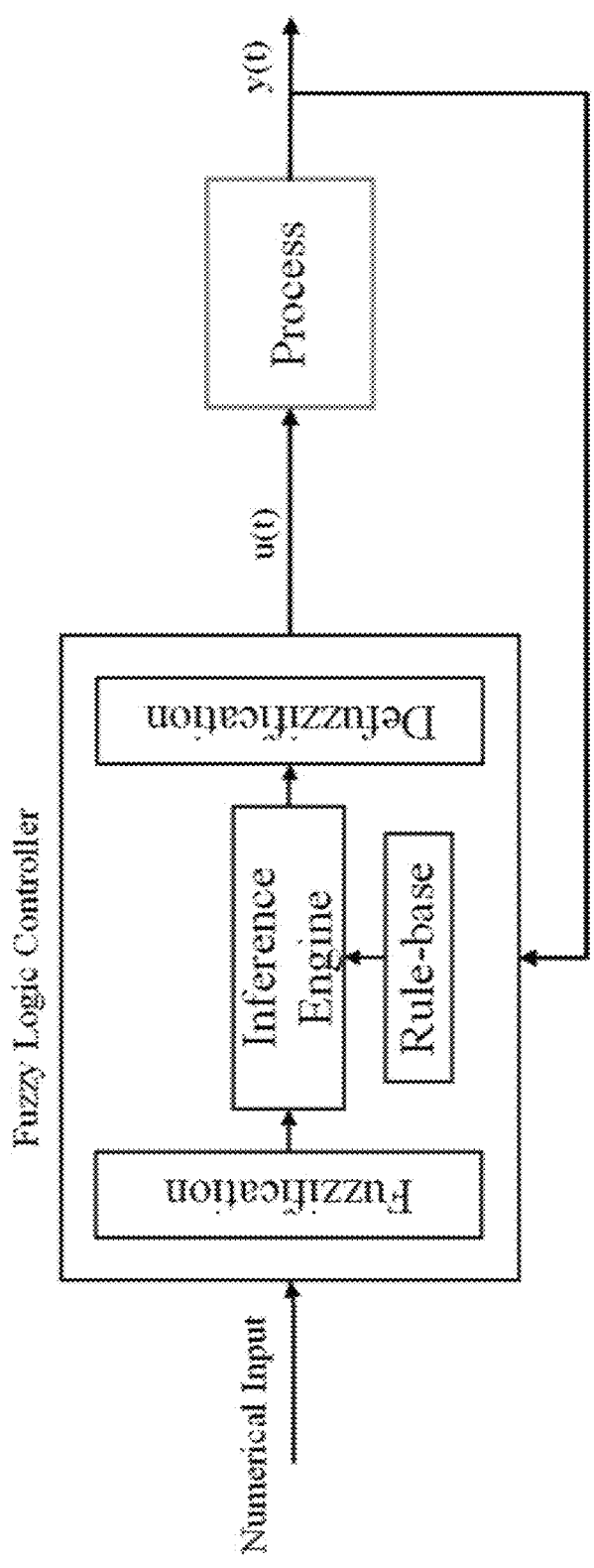
FIG. 7 shows an exemplary architecture of a fuzzy controller according to some embodiments of the disclosure.

FIG. 7 shows an exemplary architecture of a fuzzy controller according to some embodiments of the disclosure. The operation of the fuzzy control system can include four stages as follows:

(1) Fuzzification, wherein the controller inputs are mapped into linguistic expressions.

(2) Rule-base, which consists of rules in IF-THEN format.

(3) Inference engine infers fuzzy control action from the knowledge of linguistic variables and control rules.

(4) Defuzzification, wherein the fuzzy linguistic output is transferred into a numerical output.

As described by J. M. Mendel in "Uncertain rule-based fuzzy systems," Springer International Publishing 2017, a fuzzy PID (FPID) controller has been designed to control the DPHE inner pipe outlet temperature, which represents the hot fluid outlet temperature in some embodiments. The error between the desired temperature and the actual hot fluid outlet temperature, as well as the rate of change of this error, represent the inputs of the controller, while the output of the controller is the outer pipe fluid (cold fluid) mass flow rate $\dot{m}_c$.

Figure 8:
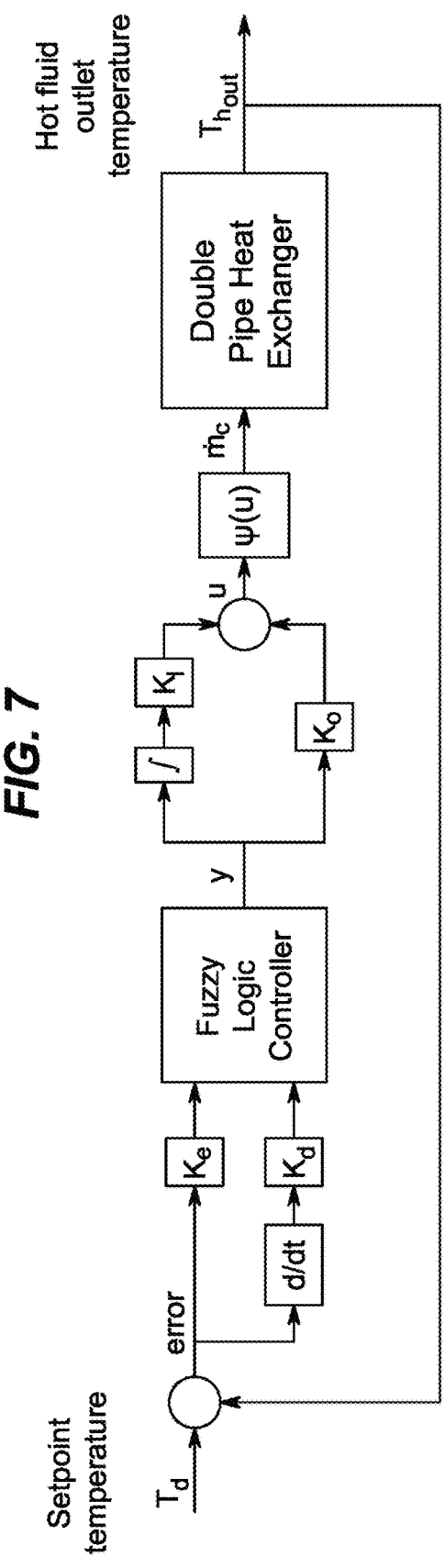
FIG. 8 shows an exemplary architecture of a fuzzy PID (FPID) controlled counter flow DPHE system according to some embodiments of the disclosure.

FIG. 8 shows an exemplary FPID controlled counter flow DPHE system according to some embodiments of the disclosure. The FPID controlled counter flow DPHE system is based on Takagi-Sugeno fuzzy systems, where $\Psi(u)$, which limits the controller output, is expressed as follows:

$$\Psi(u) = \begin{cases} 2, & u > 2 \\ u, & 0 \leq u \leq 2 \\ 0, & u < 0 \end{cases} \quad (14)$$

In FIG. 8, the parameters $K_e$ and $K_d$ are positive constants that control the controller sensitivity to the error (e) and the change in the error (de), respectively. $K_o$ is an output scaling factor, and $K_I$ is an integral gain.

Triangular membership functions are adopted for fuzzy inputs and output with an input universe of discourse as [Negative (N), Zero (Z), Positive (P)]. The output universe of discourse is [Negative Big (NB), Negative Medium (NM), Zero (Z), Positive Medium (PM), Positive Big (PB)].

FIGS. 9A-9B show the membership functions for the inputs (the error and the change in the error) of the fuzzy controller according to an embodiment of the disclosure.

FIG. 10 shows the membership functions for the output of the fuzzy controller according to an embodiment of the disclosure.

Table 2 illustrates the rules used to design the fuzzy controller according to some embodiments of the disclosure.

TABLE 2

| $\dot{m}_c$ | | $\dot{e}$ | |
|---|---|---|---|
| | N | Z | P |
| e  N | NB | NM | Z |
|    Z | NM | Z | P |
|    P | Z | PM | PB |

3. Simulation Results

According to aspects of the disclosure, the HSA is used to tune the PID controller parameters $K_{p,i}$, and $K_d$, by minimizing a cost function as expressed in equation (15), which is defined based on the Integral of Time multiplied Absolute Error (ITAE) and the standard deviation of the output vector of the controller, where the latter index is used to penalize the chattering in the controller output.

$$\text{cost function} = \frac{1}{N}\sum_{k=1}^{N} k|\epsilon(k)| + 10^3 * \sqrt{\frac{1}{N-1}\sum_{k=1}^{N}(u(k)-\bar{u})^2} \quad (15)$$

where $0 \leq u(k) \leq 2$, $0 \leq K_p \leq 5$, $0 \leq K_d \leq 10$, $0 \leq K_i \leq 10$, k represents a time index and N denotes the number of samples while E is the error between actual hot fluid outlet temperature and the desired temperature ($\epsilon = T_{h_{out}} - T_d$) while u denotes the mean value of the output vector of the fuzzy controller. The error at the steady state is more penalized than the error at the beginning because of the time multiplication term. The DPHE system is considered at its standard conditions, as shown in Table 1, where the desired temperature is 60° C., and the simulation time is set to 3 hours for example.

Figure 11:
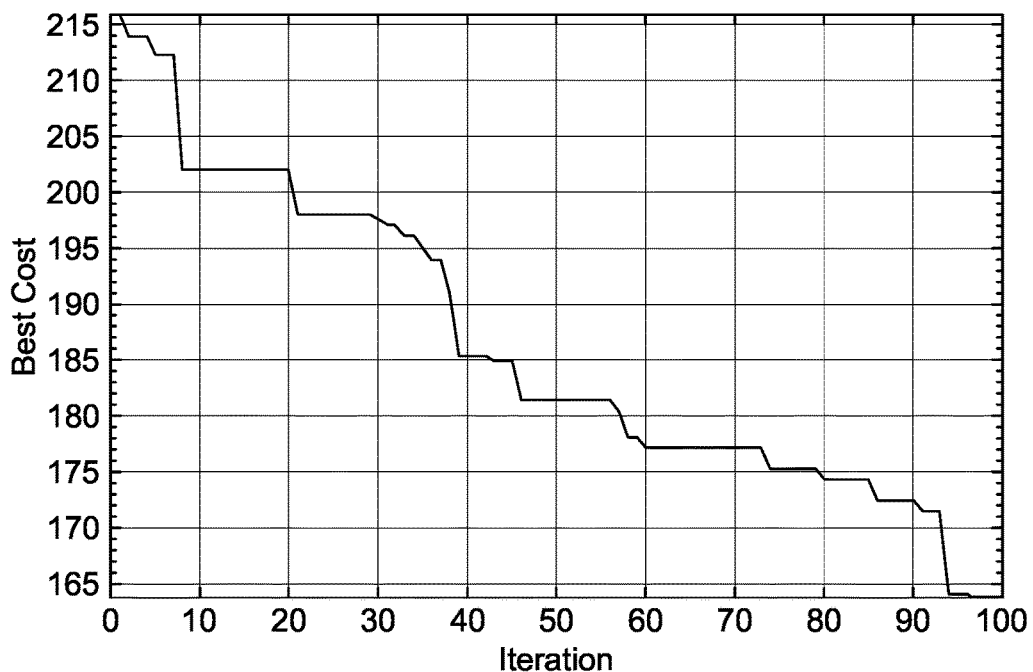
FIG. 11 shows the HSA convergence according to some embodiments of the disclosure.

FIG. 11 shows the HSA convergence according to some embodiments of the disclosure.

Table 3 shows the optimized parameters of the PID controller according to some embodiments of the disclosure.

TABLE 3

| | Parameter | | |
|---|---|---|---|
| | $K_p$ | $K_i$ | $K_d$ |
| value | 0.6553 | 0.0107 | 9.99 |

Table 4 shows the parameters of the fuzzy controller that is implemented according to the structure in FIG. 8.

TABLE 4

| | Parameter | | | |
|---|---|---|---|---|
| | $K_p$ | $K_i$ | $K_d$ | $K_o$ |
| value | 0.6553 | 0.0321 | 9.99 | 2 |

Five scenarios have been simulated for evaluating both the PID and fuzzy controllers to show the robustness of the designed controllers under different operation conditions where the controlled DPHE system has been simulated using SIMULINK.

3.1. Scenario 1: The Operation Under Nominal Conditions

Figure 12:
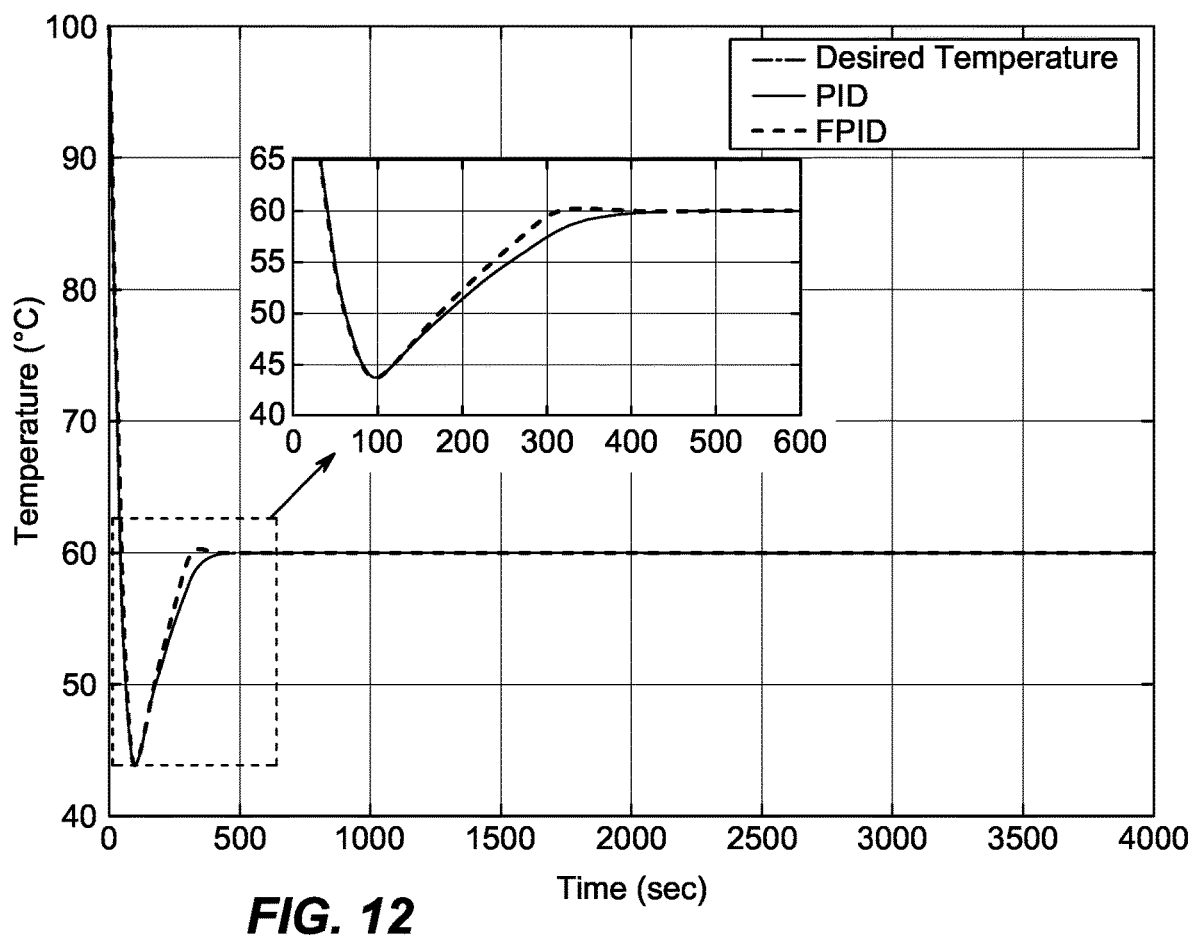
FIG. 12 shows the hot fluid outlet temperatures for the PID and FPID controlled counter flow DPHE systems under nominal conditions, respectively, according to some embodiments of the disclosure.
Figure 13:
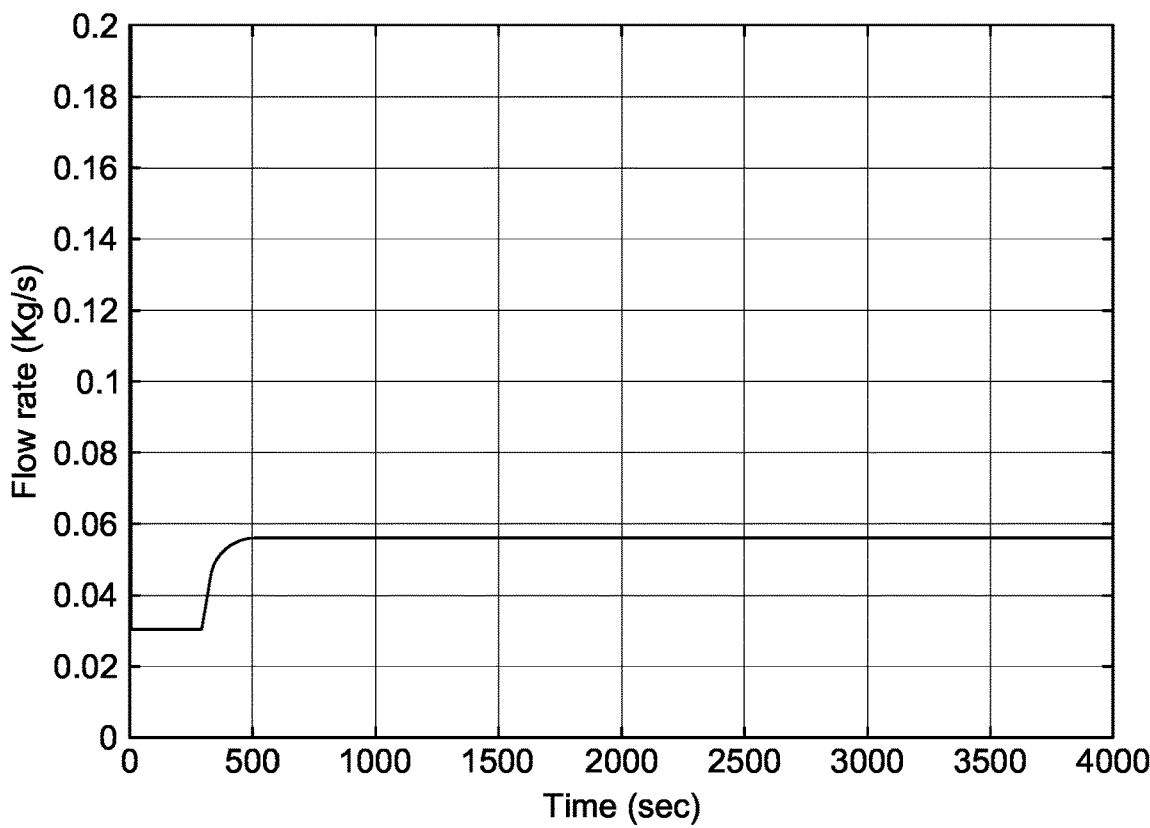
FIGS. 13-14 illustrate the cold fluid mass flow rates for the PID and FPID controlled counter flow DPHE systems under nominal conditions, respectively, according to some embodiments of the disclosure.
Figure 14:
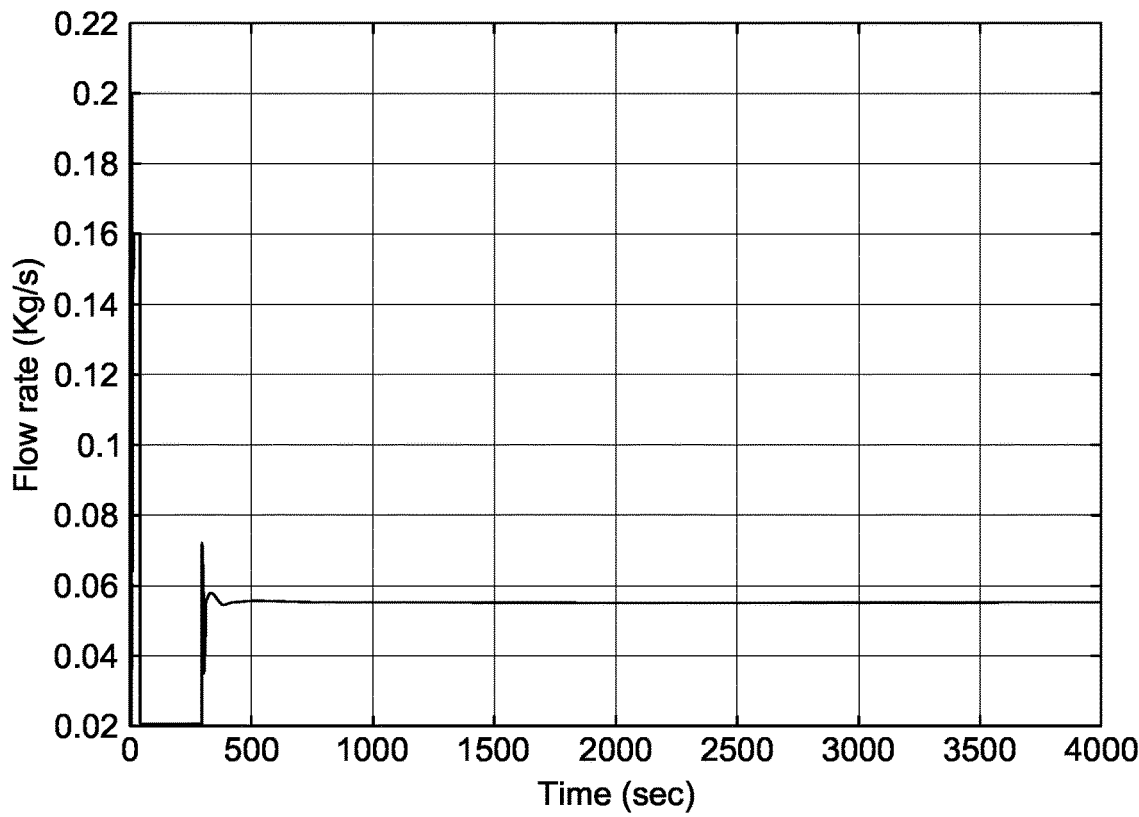
Figure 15:
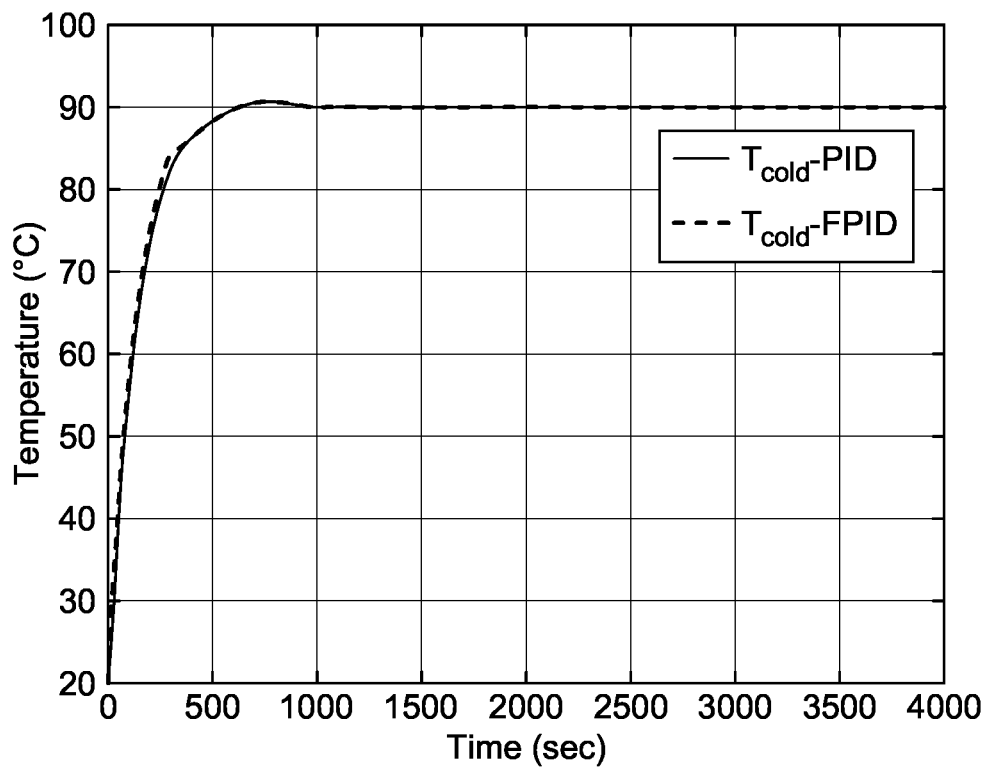
FIG. 15 shows the cold fluid outlet temperatures for the PID and FPID controlled counter flow DPHE systems under nominal conditions, respectively, according to some embodiments of the disclosure.

In this scenario, the simulation is conducted based on the DPHE nominal parameters given in Table 1, where the reference outlet temperature of the hot fluid (inner pipe fluid) has been adjusted to 60° C. FIG. 12 shows the hot fluid outlet temperatures for both controllers, where the FPID controller exhibits a better dynamic performance with a faster settling time. The PID and FPID controllers recorded an ITAE of 100 and 83.6287, respectively. FIGS. 13-14 illustrate the cold fluid mass flow rate control signals of the PID and FPID controllers, respectively, where both FPID and PID controllers show smooth outputs. The cold fluid outlet temperatures of the PID and FPID are depicted in FIG. 15.

Figure 16:
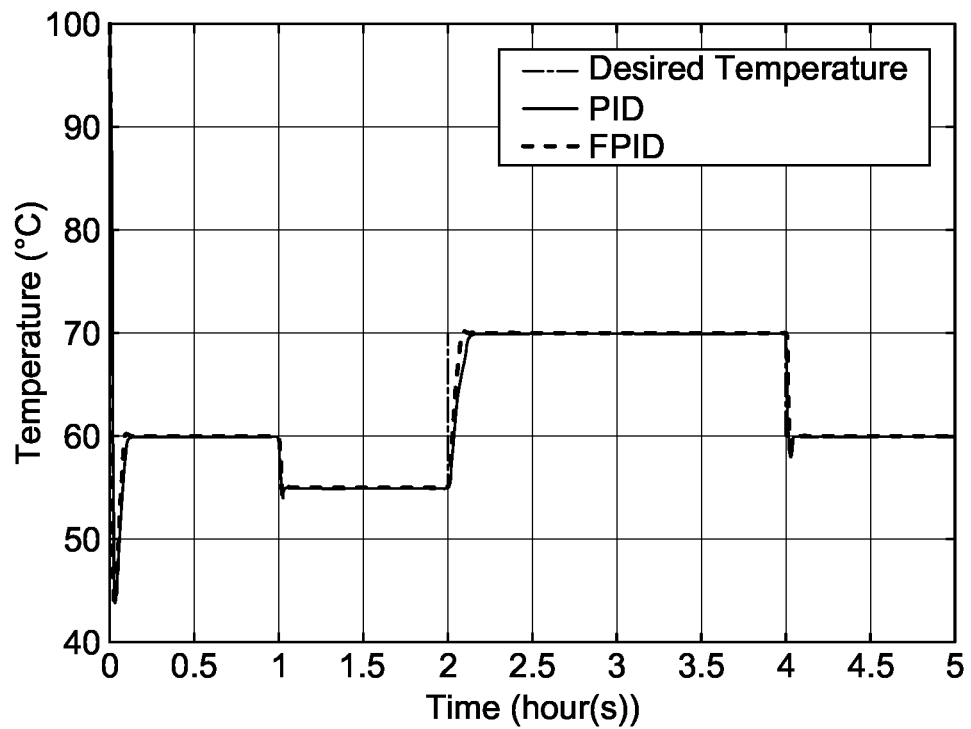
FIG. 16 shows the hot fluid outlet temperatures for the PID and FPID controlled counter flow DPHE systems under varying reference temperature conditions, respectively, according to some embodiments of the disclosure.
Figure 17:
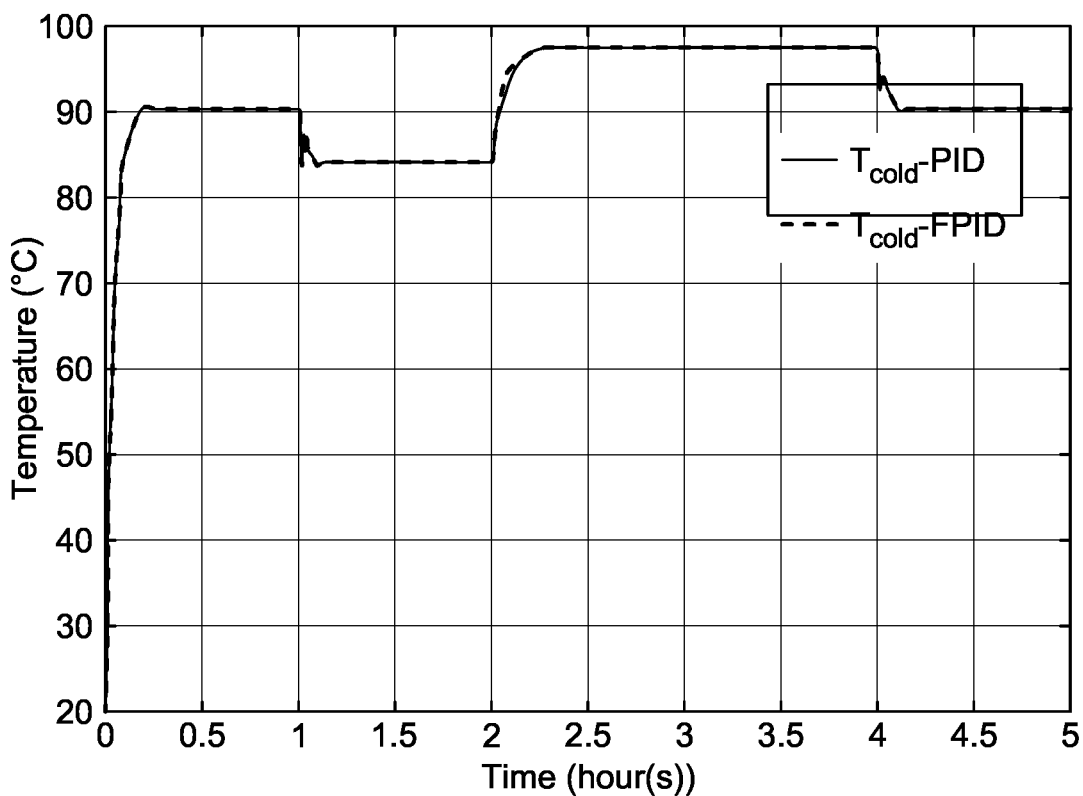
FIG. 17 shows the cold fluid outlet temperatures for the PID and FPID controlled counter flow DPHE systems under varying reference temperature conditions, respectively, according to some embodiments of the disclosure.
Figure 18:
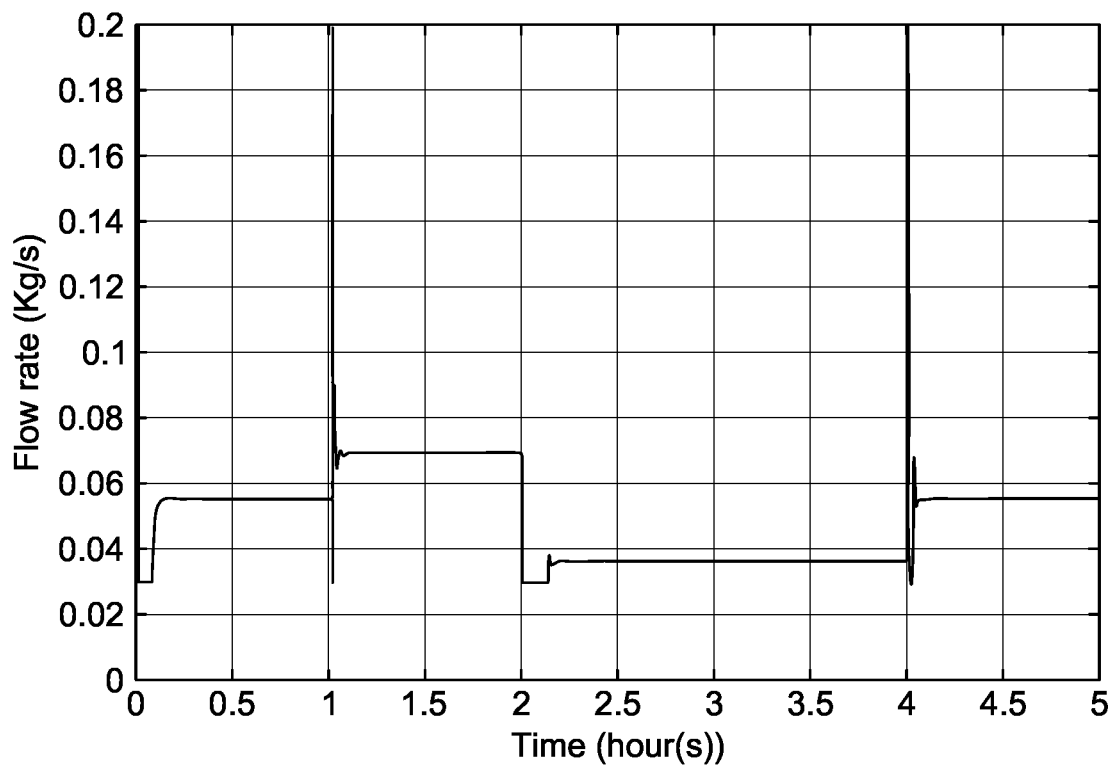
FIGS. 18-19 show the cold fluid mass flow rates for the PID and FPID controlled counter flow DPHE systems under varying reference temperature conditions, respectively, according to some embodiments of the disclosure.
Figure 19:
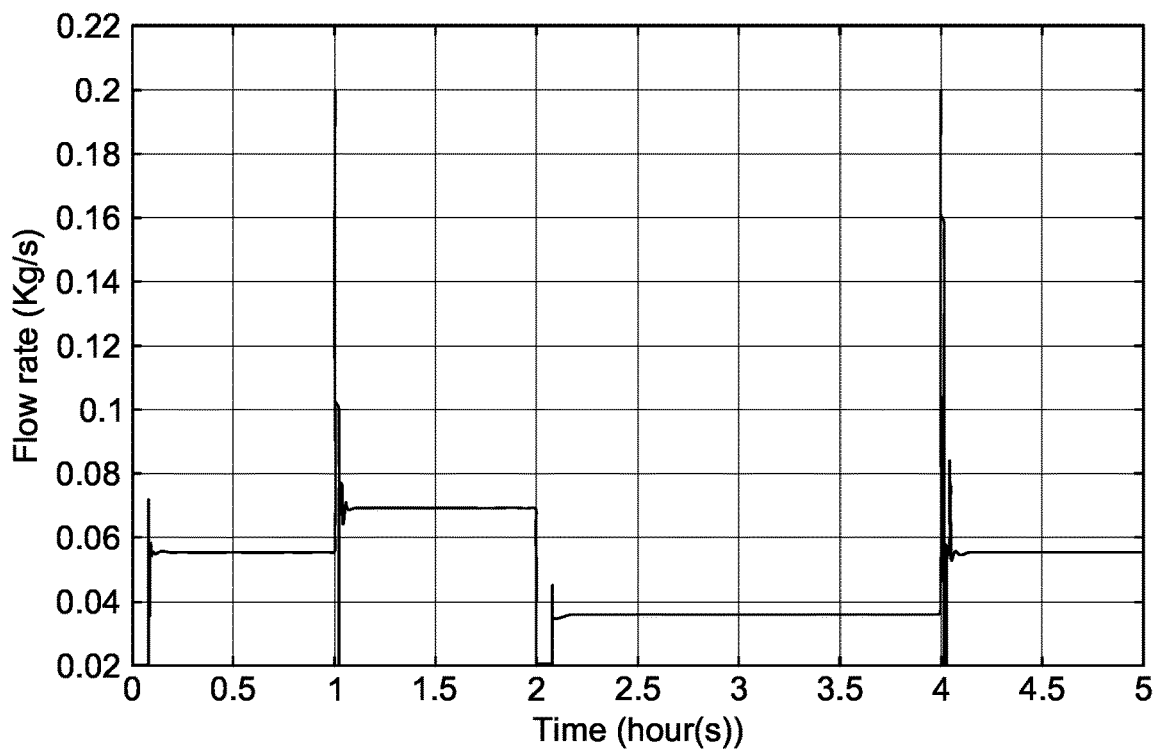

3.2. Scenario 2: Varying Reference Temperature for Inner Pipe Outlet Temperature This scenario evaluates the dynamics of the controlled DPHE system subjected to a varying reference temperature. The simulation is conducted for five hours, where the reference temperature is altered from 60° C. to 55° C., then to 70° C., and finally returned to 60° C. at the end of simulation time. FIG. 16 depicts the tracking performances of the PID and FPID controllers, whereas both controllers experience abrupt changes during the transition period from one reference to another. FIG. 17 shows the cold fluid outlet temperatures of the PID and FPID controllers under varying reference temperature conditions. The FPID controller proves a better response with ITAE equals to 1351, while the PID controller shows an ITAE of 1684. Both the FPID and PID controller outputs are shown in FIGS. 18-19, respectively.

3.3. Scenario 3: Varying Inner Pipe Inlet Flow Rate

Figure 20:
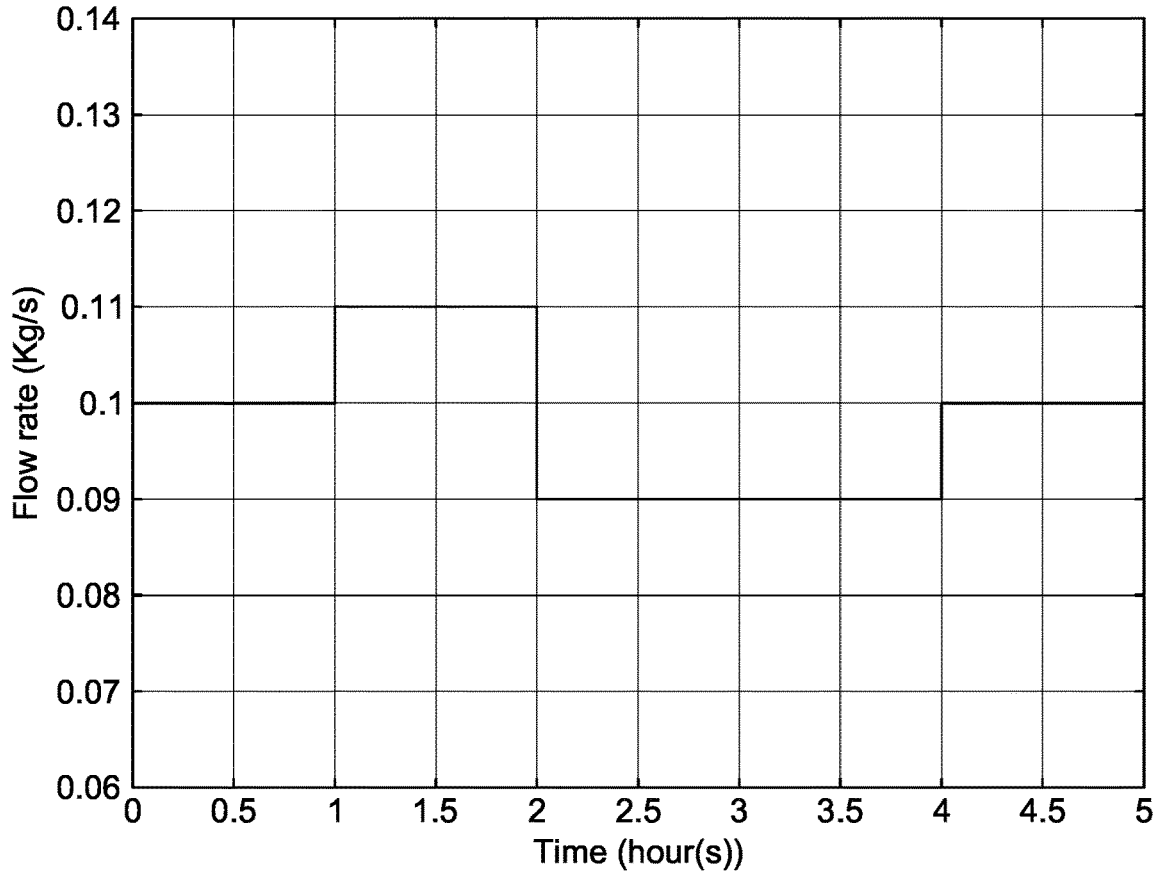
FIG. 20 shows a varied inner pipe hot fluid mass flow rate according to some embodiments of the disclosure.
Figure 21:
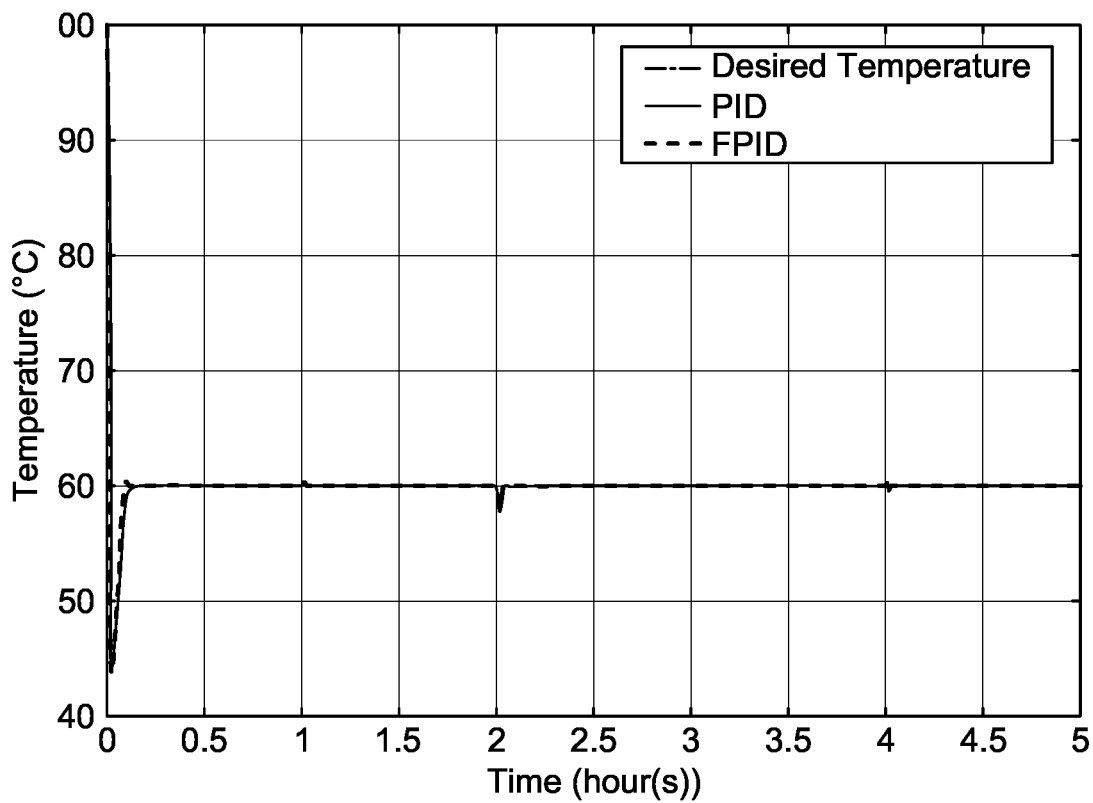
FIG. 21 shows the hot fluid outlet temperatures for the PID and FPID controlled counter flow DPHE systems under varying the hot fluid mass flow rate conditions, respectively, according to some embodiments of the disclosure.
Figure 22:
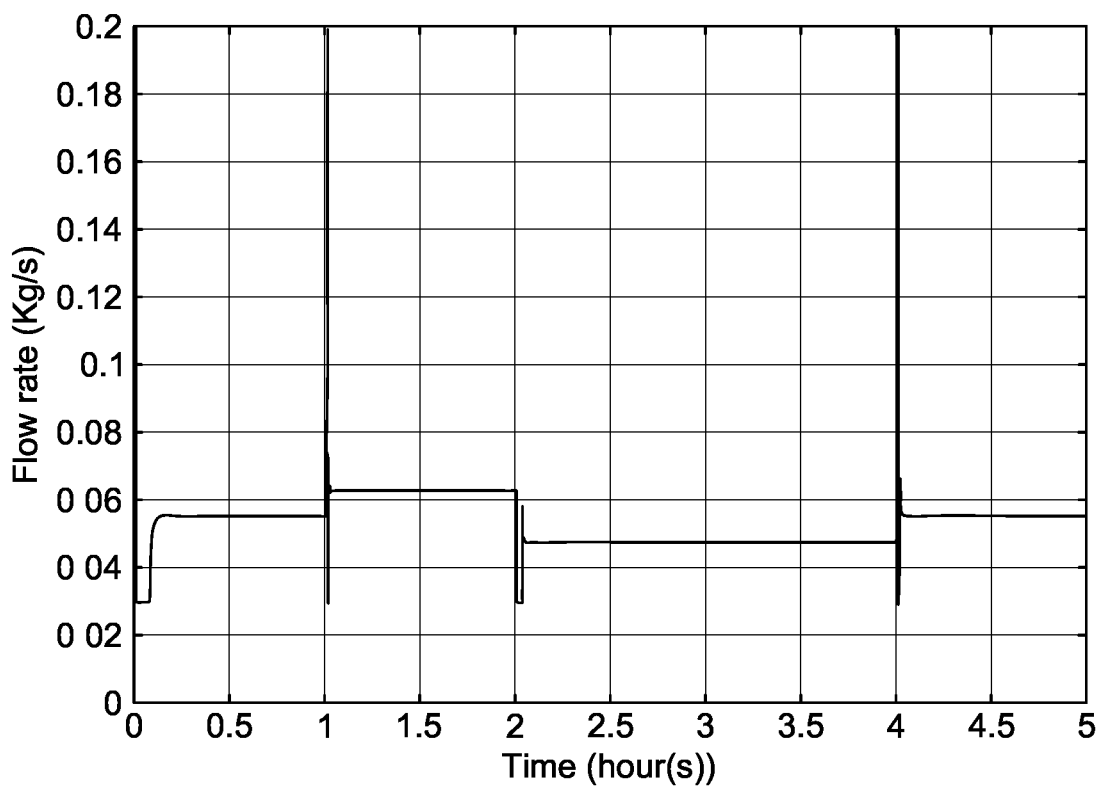
FIGS. 22-23 show the cold fluid mass flow rates for the PID and FPID controlled counter flow DPHE systems under varying the hot fluid mass flow rate conditions, respectively, according to some embodiments of the disclosure.
Figure 23:
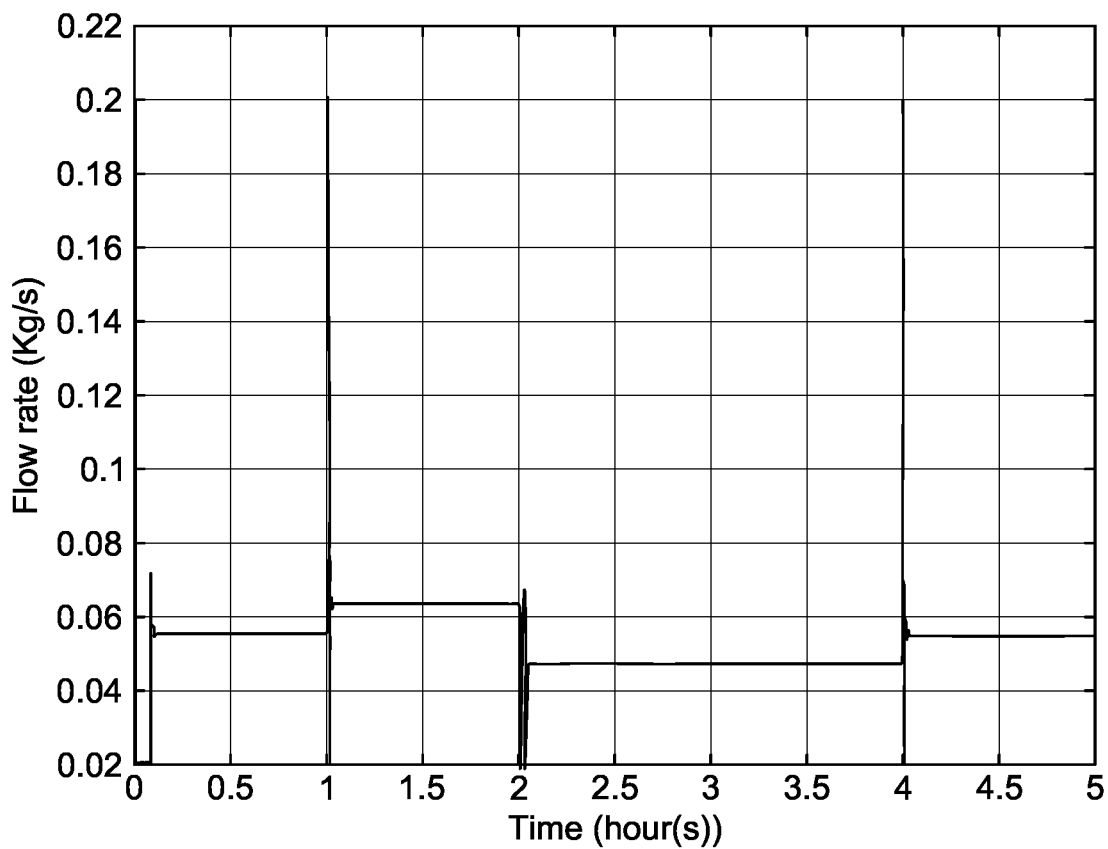
Figure 24:
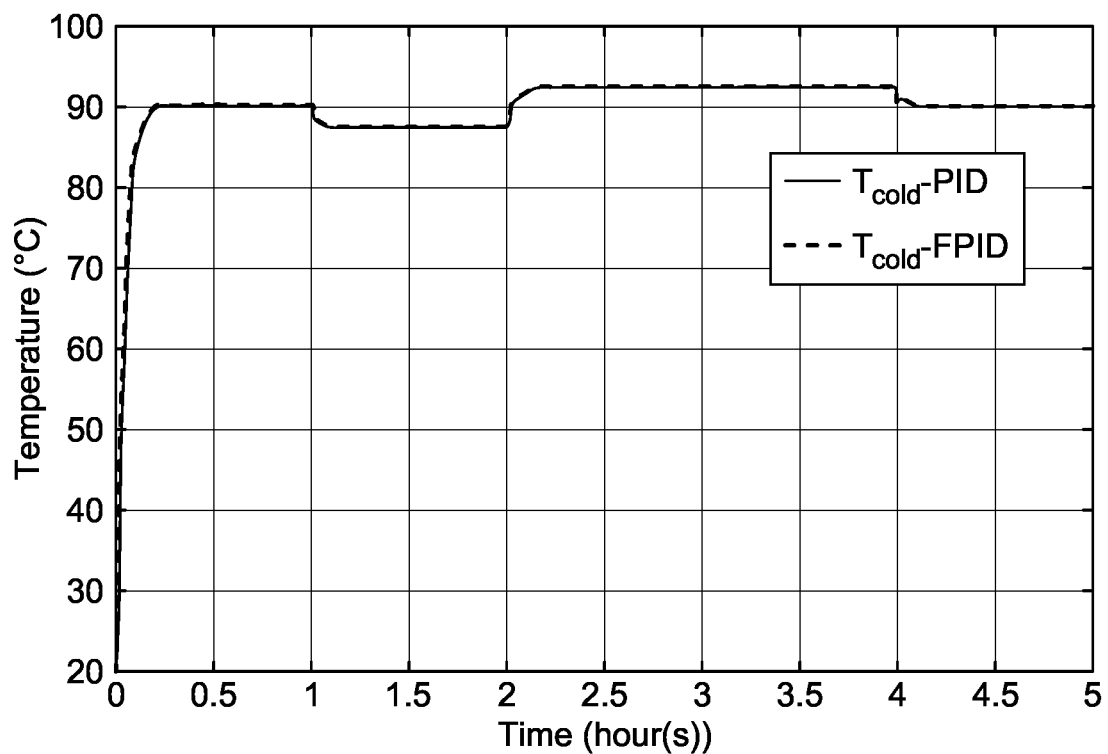
FIG. 24 shows the cold fluid outlet temperatures for the PID and FPID controlled counter flow DPHE systems under varying the hot fluid mass flow rate conditions, respectively, according to some embodiments of the disclosure.

The inner pipe (hot) fluid mass flow rate has been varied, as illustrated in FIG. 20. Both controllers have absorbed the effect of change in mass flow rate, as demonstrated in FIG. 21. The PID controller output is depicted in FIG. 22, while the outer pipe mass flow rate obtained by the FPID controller is shown in FIG. 23. The FPID and PID controllers recorded an ITAE of 85.8653 and 112.2291, respectively, which reveals that the FPID performance is better than PID in this scenario. The cold fluid outlet temperatures for the PID and FPID controllers under varying the hot fluid mass flow rate conditions are demonstrated in FIG. 24.

3.4. Scenario 4: Varying Inlet Temperatures

Figure 25:
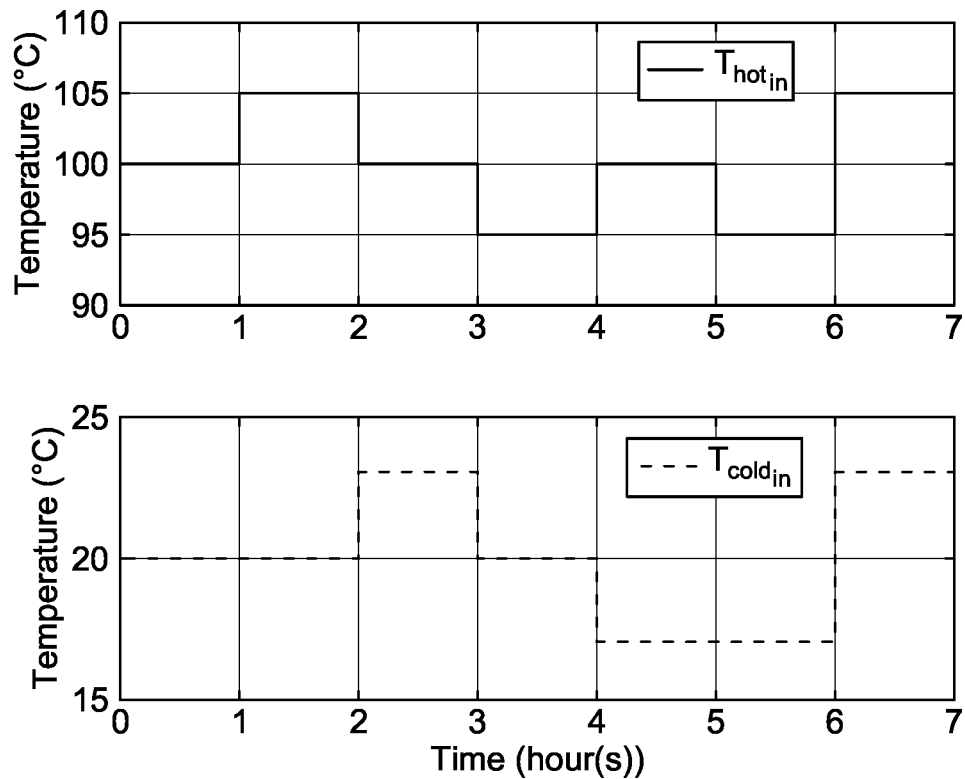
FIG. 25 shows a varied hot fluid inlet temperature and a varied cold fluid inlet temperature, respectively, according to some embodiments of the disclosure.

This scenario investigates the effect of change in the inlet temperatures of the feedback controlled DPHE on the inner outlet temperature regulation. The hot fluid inlet temperature has been altered within the range 95° C. to 105° C.; at the same time, the cold fluid inlet temperature has been varied between 17° C. and 23° C., as illustrated in FIG. 25.

Figure 26:
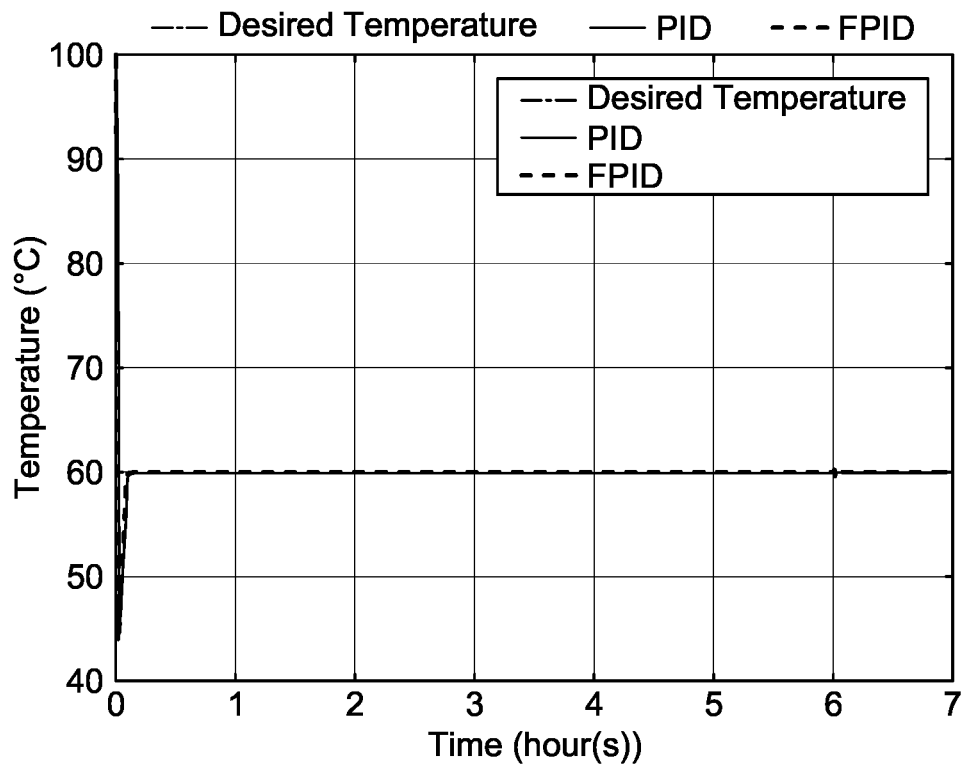
FIG. 26 shows the hot fluid outlet temperatures for the PID and FPID controlled counter flow DPHE systems under varying inlet temperature conditions, respectively, according to some embodiments of the disclosure.
Figure 27:
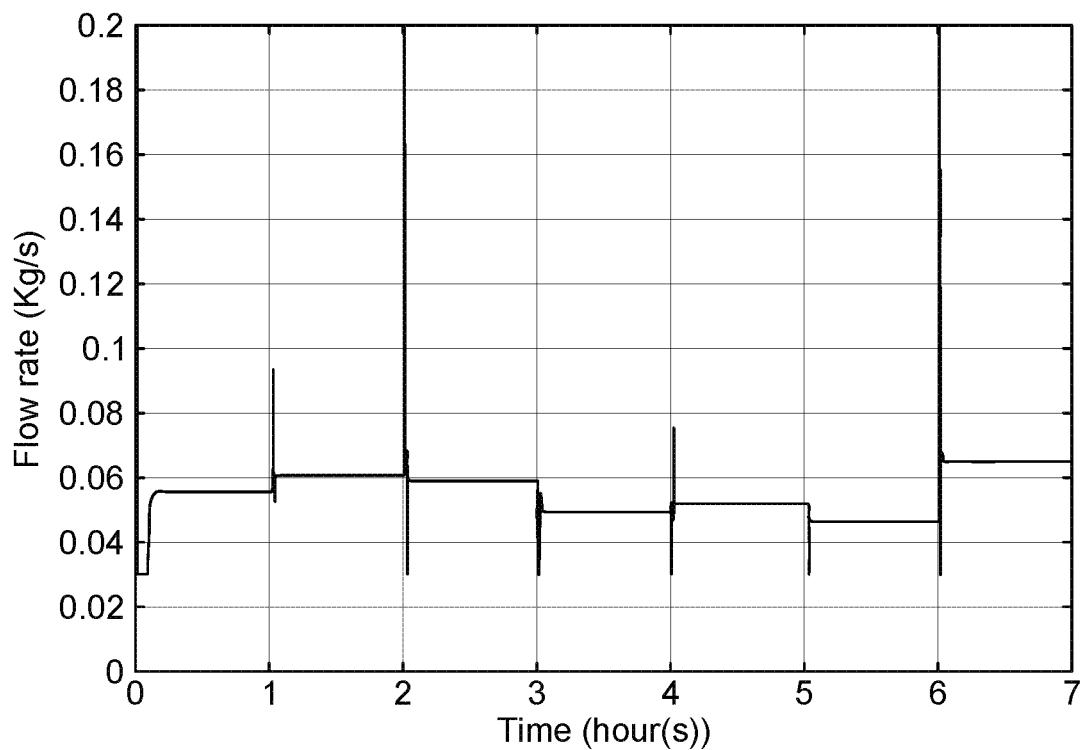
FIGS. 27-28 show the cold fluid mass flow rates for the PID and FPID controlled counter flow DPHE systems under varying the inlet temperature conditions, respectively, according to some embodiments of the disclosure.
Figure 28:
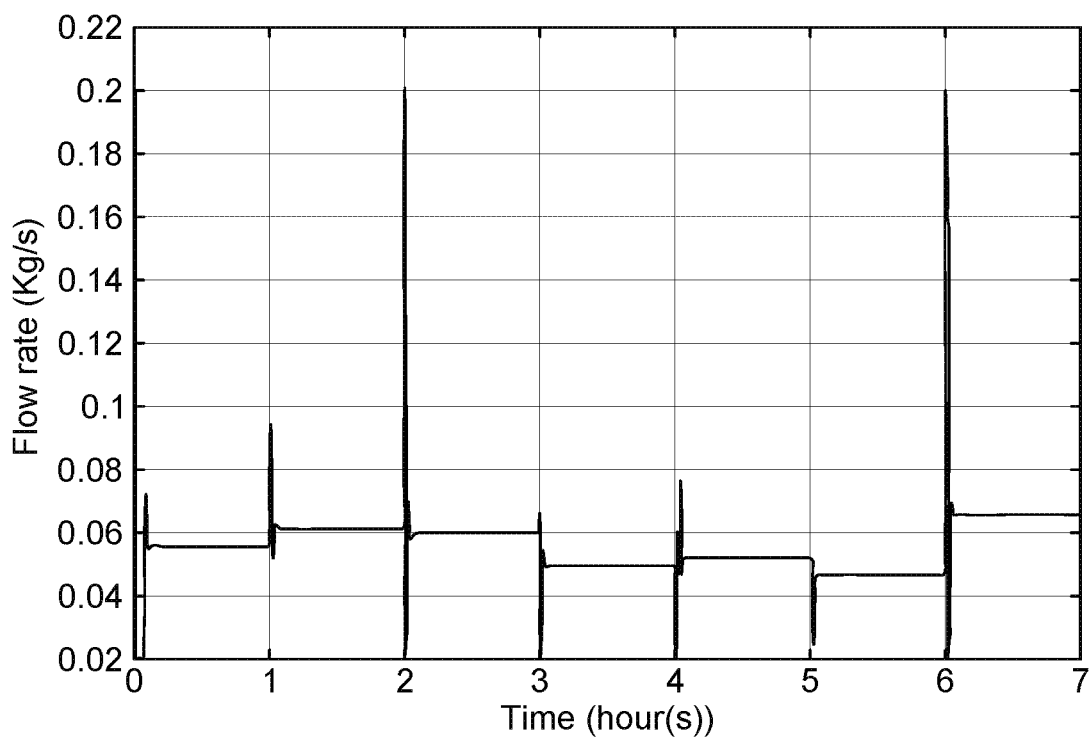
Figure 29:
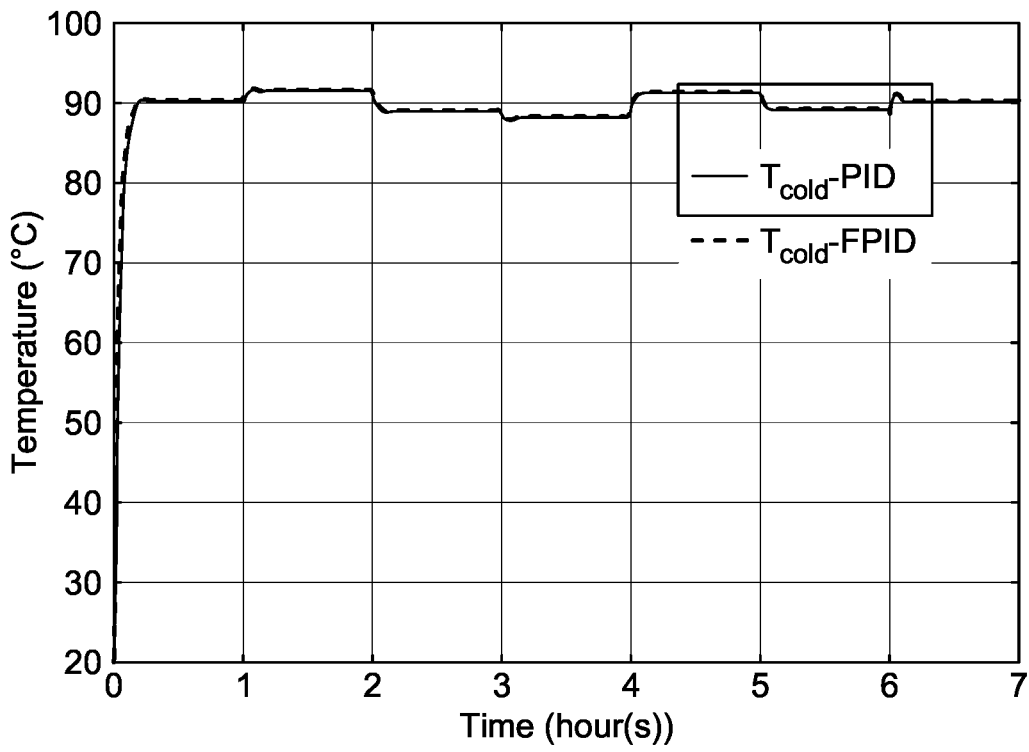
FIG. 29 shows the cold fluid outlet temperatures for the PID and FPID controlled counter flow DPHE systems under varying the inlet temperature conditions, respectively, according to some embodiments of the disclosure.

FIG. 26 shows the inner pipe outlet temperatures for the PID and FPID controllers, where both controllers offer satisfactory responses. ITAE for the FPID controller is 31.4135, while the PID controller has a higher ITAE of 36.16. FIGS. 27-28 depict the mass flow rate control signals obtained from the PID controller and FPID, respectively. The outer pipe outlet temperatures are illustrated in FIG. 29.

3.5. Scenario 5: Fouling Build-up

Figure 30:
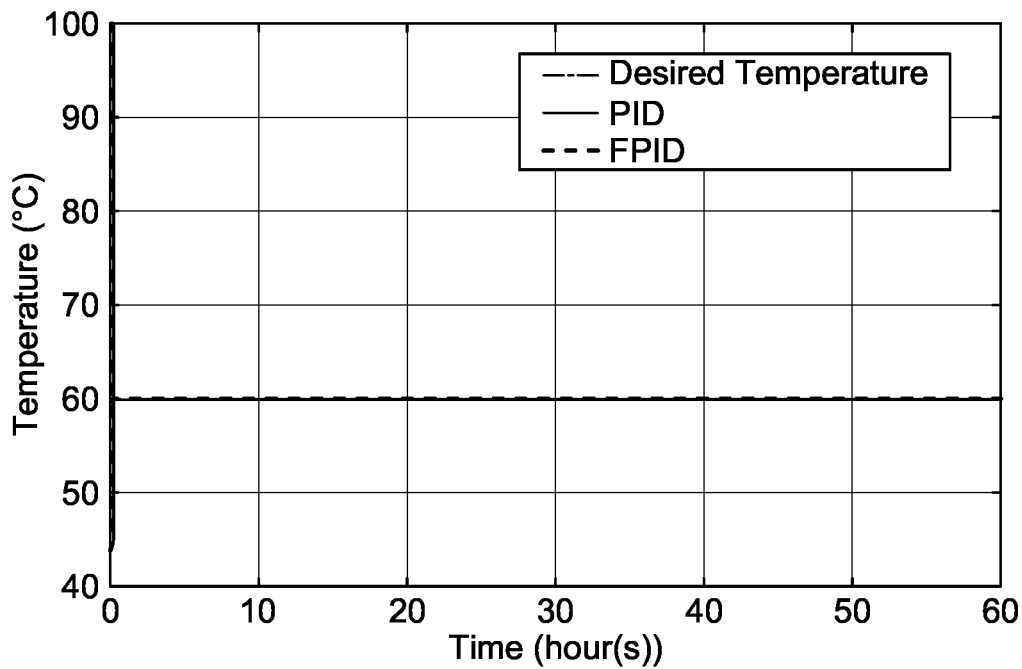
FIG. 30 shows the hot fluid outlet temperatures for the PID and FPID controlled counter flow DPHE systems under fouling build-up conditions, respectively, according to some embodiments of the disclosure.

In this scenario, the fouling build-up has been deemed where the fouling resistance is varied, as demonstrated in FIG. 3, to investigate the fouling influence on the FPID and PID controller performances. The build-up of the fouling starts after 5 hours and continues until it reaches the peak value at the end of the simulation period, which is equivalent to a reduction in the heat transfer coefficient by 50%. Both controllers demonstrated excellent regulation capability, as shown in FIG. 30. The FPID controller shows an ITAE value equals 5.17 versus 5.4 for the PID controller.

Table 5 compares the PID and FPID controlled DPHE errors based on IATE and integral square error (ISE) indexes. Based on the comparison, it is apparent that the FPID controlled DPHE has a better performance for all considered operating scenarios.

TABLE 5

| | IATE (PID) | IATE (FPID) | ISE (PID) | ISE (PID) |
|---|---|---|---|---|
| Scenario 1 | 100 | 83.63 | 10.90 | 10.71 |
| Scenario 2 | 1684.9 | 1351.2 | 4.26 | 3.81 |
| Scenario 3 | 112.22 | 85.87 | 2.46 | 2.39 |
| Scenario 4 | 36.16 | 34.41 | 1.74 | 1.70 |
| Scenario 5 | 5.41 | 5.17 | 0.20 | 0.20 |

Figure 31:
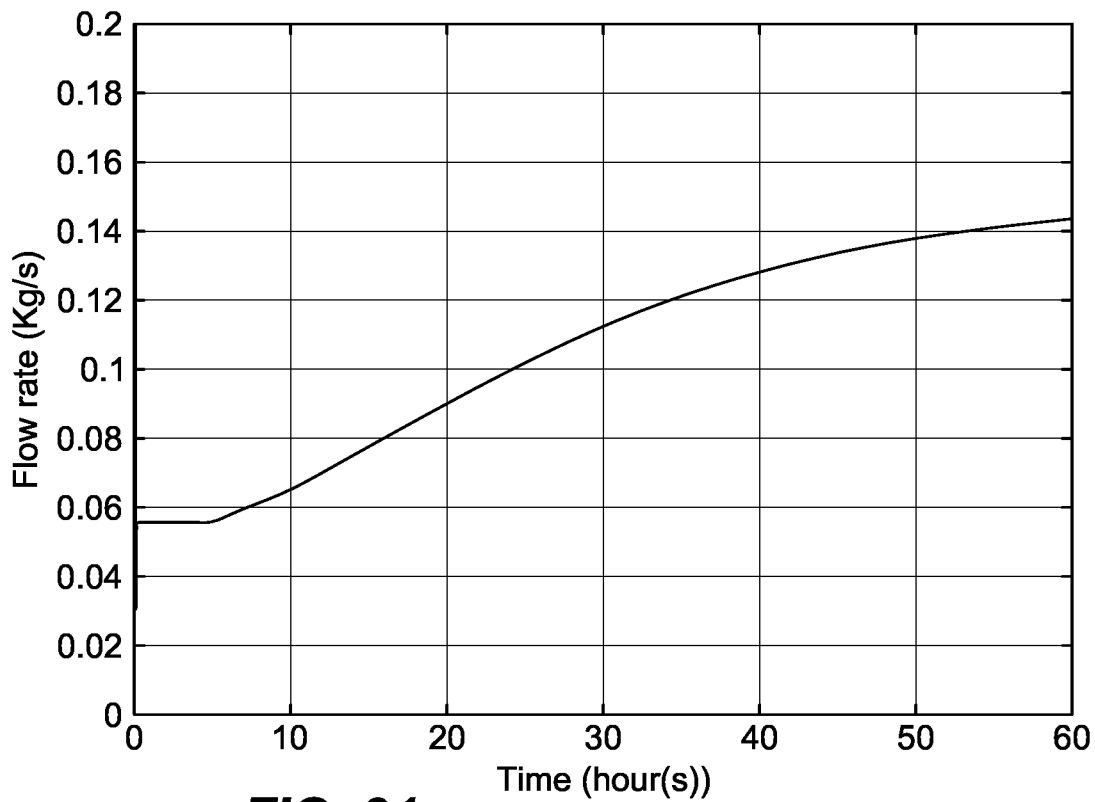
FIGS. 31-32 show the cold fluid mass flow rates for the PID and FPID controlled counter flow DPHE systems under fouling build-up conditions, respectively, according to some embodiments of the disclosure.
Figure 32:
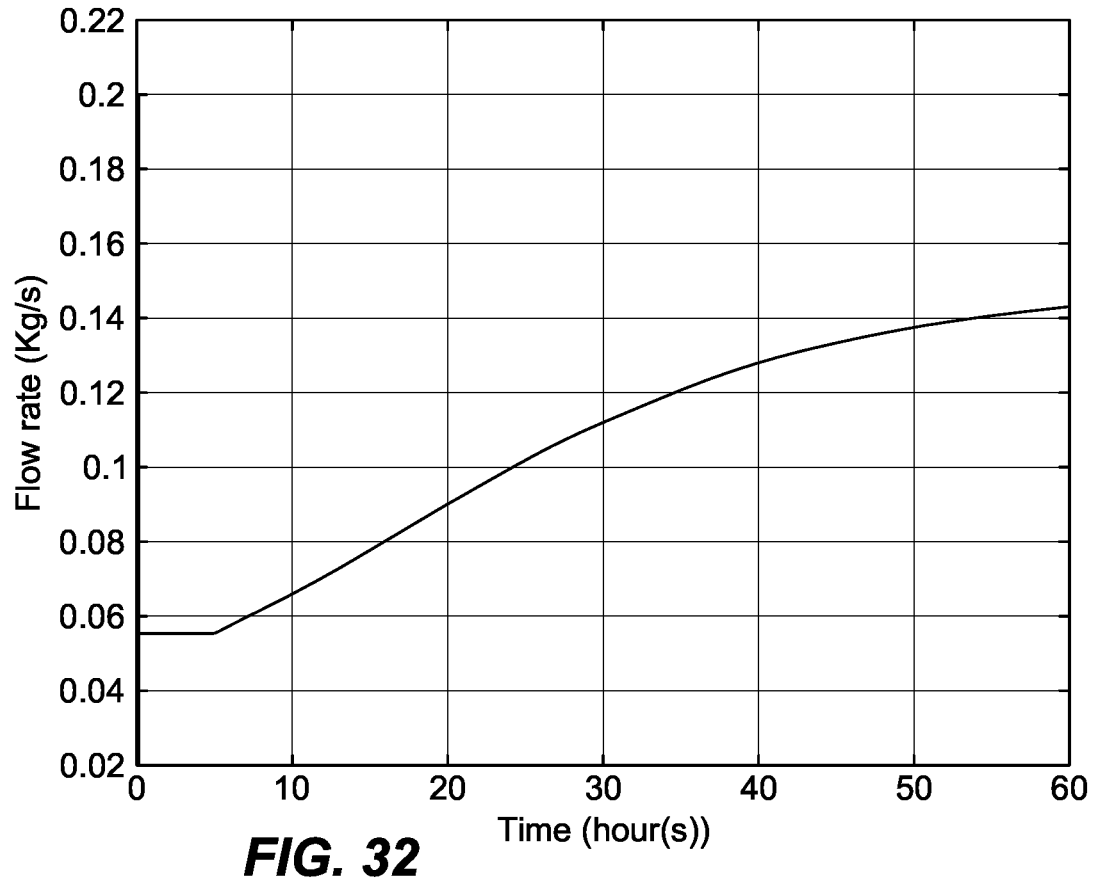
Figure 33:
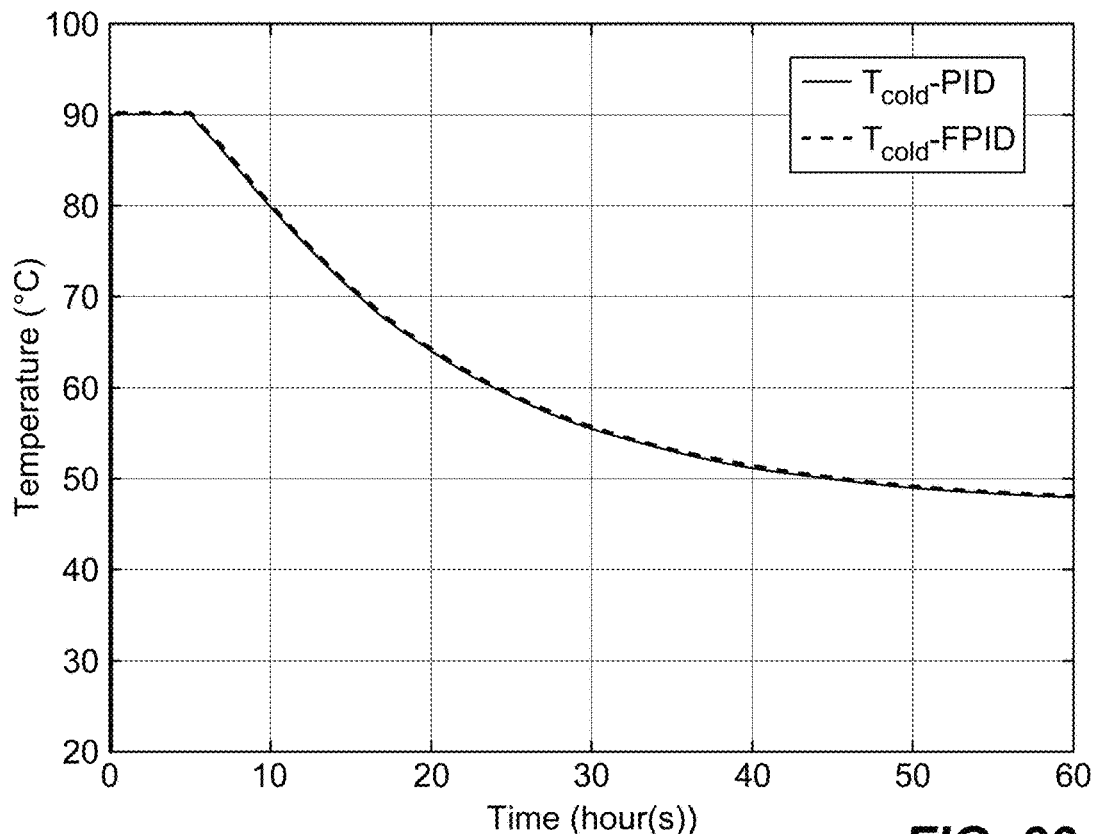
FIG. 33 shows the cold fluid outlet temperatures for the PID and FPID controlled counter flow DPHE systems under fouling build-up conditions, respectively, according to some embodiments of the disclosure.

FIGS. 31-32 show the cold fluid mass flow rates for both PID controller and FPID, correspondingly, while FIG. 33 depicts the cold fluid outlet temperatures of the DPHE using the PID and FPID controllers under fouling build-up conditions, respectively.

4. Flowcharts of Operating the DPHE

Figure 34:
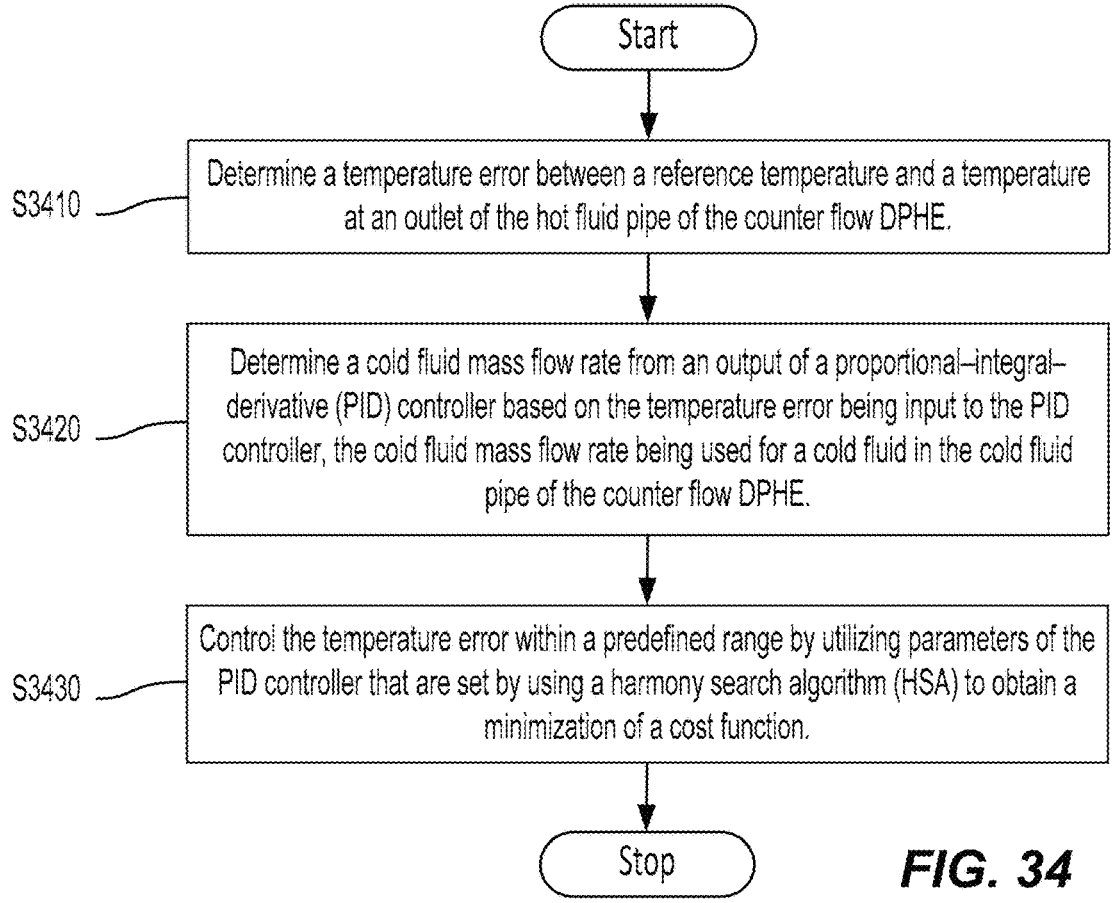
FIG. 34 shows a flowchart of operating the PID controlled counter flow DPHE system according to some embodiments of the disclosure.

FIG. 34 shows a flowchart of a process to operate the PID controlled counter flow DPHE system according to some embodiments of the disclosure.

In step S3410, the process determines a temperature error between a reference temperature and a temperature at an outlet of the hot fluid pipe of the counter flow DPHE.

In step S3420, the process determines a cold fluid mass flow rate from an output of a PID controller based on the temperature error being input to the PID controller, the cold fluid mass flow rate being used for a cold fluid in the cold fluid pipe of the counter flow DPHE.

In step S3430, the process controls the temperature error within a predefined range by utilizing parameters of the PID controller that are set by using a harmony search algorithm (HSA) to obtain a minimization of a cost function.

In an embodiment, the hot fluid pipe and the cold fluid pipe are an inner pipe and an outer pipe of the counter flow DPHE, respectively.

In an embodiment, the parameters of the PID controller include a proportional gain $K_p$, a derivative gain $K_d$, and an integral gain $K_i$.

In an embodiment, $0 \leq K_p \leq 5$, $0 \leq K_d \leq 10$, and $0 \leq K_i \leq 10$.

In an embodiment, the cost function is given by $$\text{cost function} = \frac{1}{N}\sum_{k=1}^{N} k|\epsilon(k)| + 10^3 * \sqrt{\frac{1}{N-1}\sum_{k=1}^{N}(u(k)-\mu)^2},$$

wherein N denotes a total number of time samples during the minimization of the cost function, k denotes a time index, $\epsilon$ denotes the temperature error, $u \in [0,2]$ denotes the output of the PID controller, and $\mu$ denotes a mean value of the outputs of the PID controller during the minimization of the cost function.

In an embodiment, the minimization of the cost function includes multiple iterations, wherein each iteration includes: (i) generating a first plurality of candidate parameters from a second plurality of parameters according to a pitch adjusting rate (PAR) and a harmony memory considering rate (HMCR) of the HSA, the second plurality of parameters being stored in a harmony memory (HM); (ii) determining whether a result of the cost function based on a subset of the first plurality of candidate parameters is less than a result of the cost function based on a subset of the second plurality of parameters; (iii) in response to a determination that the result of the cost function based on the subset of the first plurality of candidate parameters is less than the result of the cost function based on the subset of the second plurality of parameters, replacing the subset of the second plurality of parameters with the subset of the first plurality of candidate parameters in the HM; and (iv) in response to a determination that the result of the cost function based on the subset of the first plurality of candidate parameters is not less than the result of the cost function based on the subset of the second plurality of parameters, removing the subset of the first plurality of candidate parameters.

In an embodiment, the PAR is given by $x_{new} = x_{old} + FW \cdot \epsilon$, wherein $x_{old}$ denotes a current pitch, FW is a fret width, $\epsilon \in (0,1]$ is a random number, and $x_{new}$ denotes an adjusted pitch.

In an embodiment, $$FW(i) = FW_{max}\exp\left(\ln\left(\frac{FW_{min}}{FW_{max}}\right) * \frac{i}{NI}\right),$$

wherein $FW_{max}$ denotes a maximum fret width, $FW_{min}$ denotes a minimum fret width, NI is a total number of iterations, and i is a current iteration number.

Figure 35:
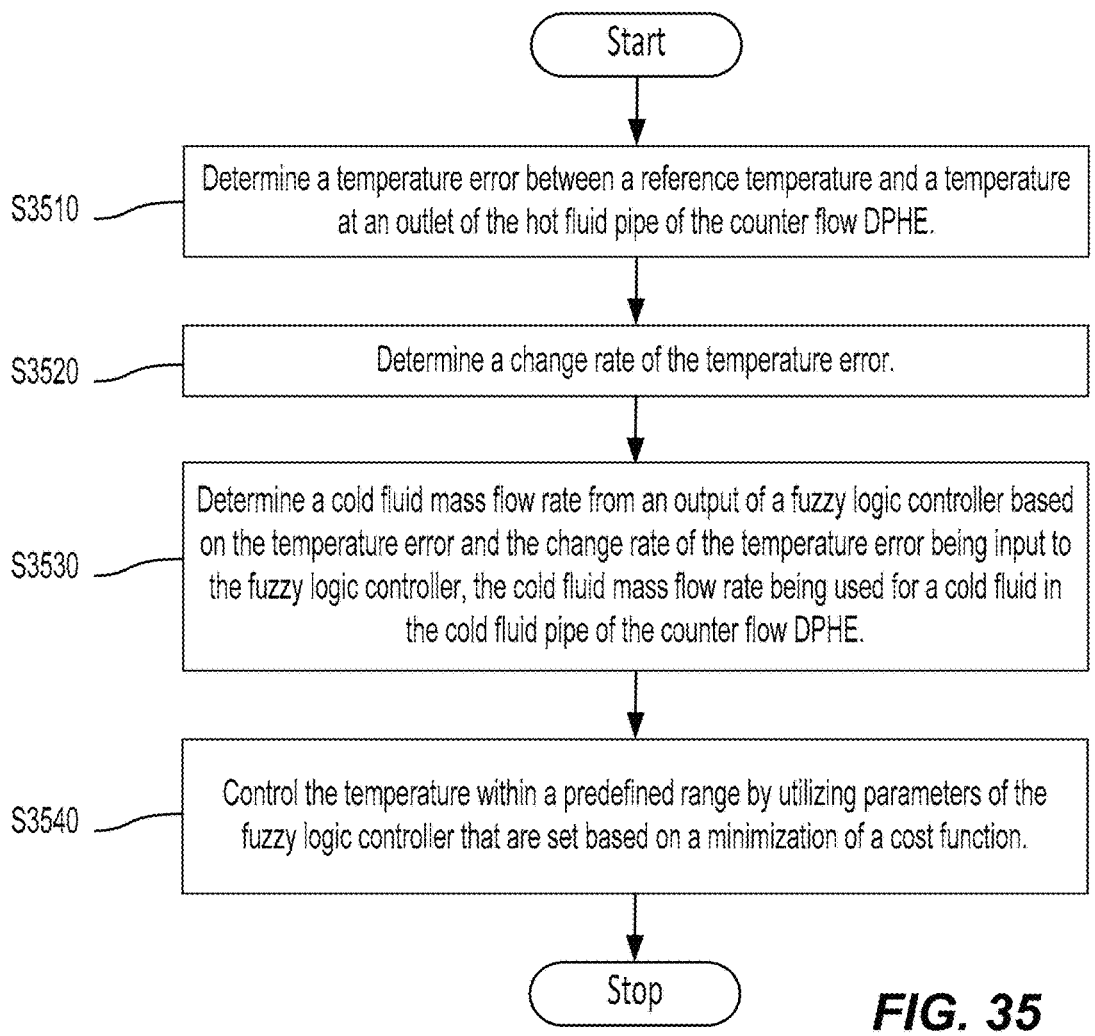
FIG. 35 shows a flowchart of operating the FPID controlled counter flow DPHE system according to some embodiments of the disclosure.

FIG. 35 shows a flowchart of a process to operate the FPID controlled counter flow DPHE system according to some embodiments of the disclosure.

In step S3510, the process determines a temperature error between a reference temperature and a temperature at an outlet of the hot fluid pipe of the counter flow DPHE.

In step S3520, the process determines a change rate of the temperature error.

In step S3530, the process determines a cold fluid mass flow rate from an output of a fuzzy logic controller based on the temperature error and the change rate of the temperature error being input to the fuzzy logic controller, the cold fluid mass flow rate being used for a cold fluid in the cold fluid pipe of the counter flow DPHE.

In step S3540, the process controls the temperature within a predefined range by utilizing parameters of the fuzzy logic controller that are set based on a minimization of a cost function.

In an embodiment, the output of the fuzzy controller is limited by a function given by $$\Psi(u) = \begin{cases} 2, & u > 2 \\ u, & 0 \leq u \leq 2, \\ 0, & u < 0 \end{cases}$$

wherein u denotes the output of the fuzzy controller.

5. Heat Exchanger Fouling Prediction Using Artificial Intelligence

This disclosure also includes a data driven approach to predict the tube fouling in a shell and tube heat exchanger (STHX) so that the cleaning process of the fouling can be scheduled before the fouling reaches a severe level.

According to aspects of the disclosure, a feedforward artificial neural network (ANN) is used for real-time fouling estimation and a long short-term memory (LSTM) neural network is adopted for prediction purposes.

5.1. Mathematical Model

The STHX is one of the prevalent and common types of heat exchangers that are used extensively in a board range of industrial processes. It includes a tube bundle that contains one of a hot fluid and a cold fluid while the shell contains the other fluid.

As described by T. Ardsomang et al. in "Heat exchanger fouling and estimation of remaining useful life," Proc. Annu. Conf. Progn. Heal. Manag. Soc., pp. 150-158, 2013, the heat transfer rate of the STHX can be written as follows, $$Q = U_o A \Delta T_{LMTD} F \quad (16)$$

where A is the area of the heat transfer, $U_o$ is the overall coefficient of heat transfer, $\Delta T_{LMTD}$ is the logarithmic mean temperature difference (LMTD) which is given by Equation (17), and F is the correction factor of LMTD.

$$\Delta T_{LMTD} = \frac{\Delta T_1 - \Delta T_2}{\ln(\Delta T_1) - \ln(\Delta T_2)} \quad (17)$$

In case of counter current flow $$\Delta T_1 = T_{hi} - T_{co}, \Delta T_2 = T_{ho} - T_{ci} \quad (18)$$

where $h_i$ and $c_i$ denote the inlet temperatures of the hot and cold fluids, respectively, while $h_o$ and $c_o$ denote the outlet temperatures of the hot and cold fluids, respectively.

The rate of the heat transfer can also be written based on energy balance as $$Q = m_h C_{P_h} \Delta T_h = m_c C_{P_c} \Delta T_c \quad (19)$$

where $C_{P_h}$ is the hot fluid specific heat capacity in J/(kg·K), $C_{P_c}$ is the cold fluid specific heat capacity in J/(kg·K), $m_h$ is the hot fluid mass flow rate in kg/s, $m_c$ is the cold fluid mass flow rate in kg/s, $\Delta T_h$ is the hot fluid temperature difference in K, and $\Delta T_c$ is the cold fluid temperature difference in K.

The overall heat transfer coefficient is given by $$\frac{1}{U_o} = \frac{1}{U_c} + R_f \quad (20)$$

where $U_c$ is the heat transfer coefficient at clean state in $$\frac{W}{m^2 K},$$

and $R_f$ is the fouling factor or resistance in $$\frac{m^2 K}{W}.$$

5.2. Artificial Neural Networks (ANN)

The ANN is a computational model inspirited by the biological neurons in the human nervous system. The ANN is one variant of data-driven models and it is known by its capability to extrapolate complex nonlinear relationships between inputs sequence and the corresponding output(s).

Figure 36:
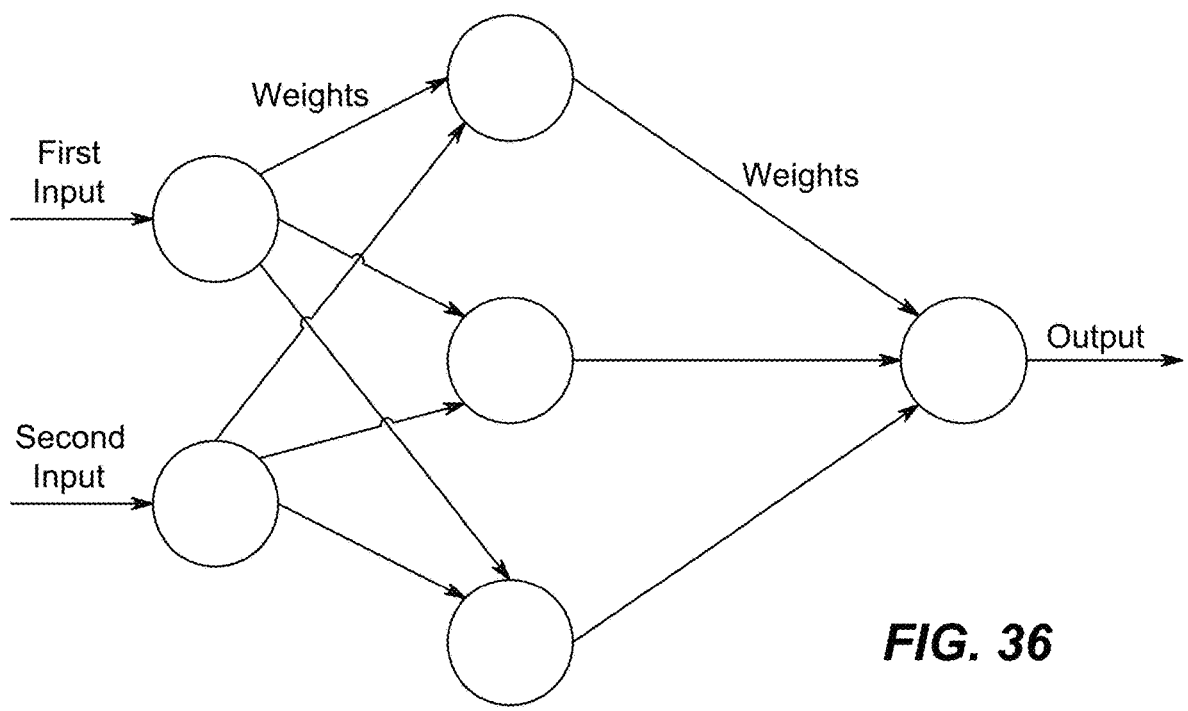
FIG. 36 shows a simplified artificial neuron network (ANN) architecture according to some embodiments of the disclosure.

FIG. 36 shows a simplified ANN architecture according to some embodiments of the disclosure.

Figure 37:
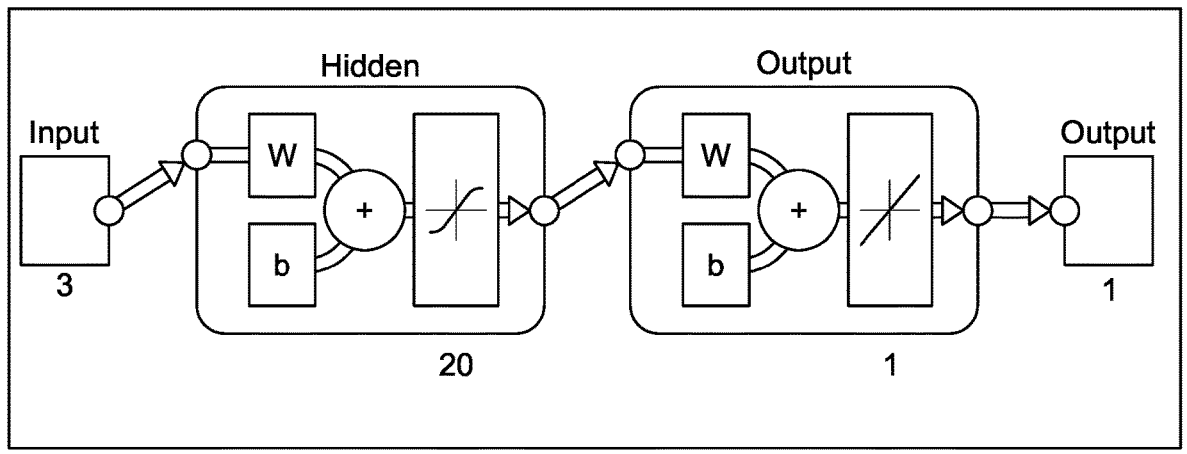
FIG. 37 shows an exemplary implemented ANN architecture according to some embodiments of the disclosure.

FIG. 37 shows an exemplary implemented ANN architecture according to some embodiments of the disclosure.

The implemented ANN architecture involves three layers: input layer, hidden layer, and output layer. Each layer contains several neurons, as described by S. Haykin in "Neural networks and learning machines, vol. 3" which was published by Pearson Prentice Hall New Jersey in 2008. Input and output layer dimensions are determined according to the given input and output whereas the hidden layer dimension depends on the complexity of the required task. Each neuron performs a weighted sum operation on its inputs and passes this summation through a differentiable activation function which can be either a linear or a nonlinear function. The output of the neuron is given by $$h = f(W^T X + b) \quad (21)$$

where h is the output of the neuron, X is the input vector of the neuron, W is a weight vector, b is a constant representing a bias of the neuron, and f is an activation function, as described by M. Gopal in "Applied Machine Learning," McGraw-Hill Education in 2018.

The ANN complexity is proportional to the number of neurons in hidden layer besides the number of hidden layers. If there is more than one hidden layer in the ANN architecture, then it is referred to as a deep neural network.

Typically, given the input and the target output as in classification or regression problems, the ANN training process is performed using gradient decent or one of its variants as an optimization algorithm while the weight update is accomplished via a backpropagation algorithm based on a pre-defined objective function. The ANN has several hyper-parameters that affect the training performance such as the number of hidden layers, the number of hidden neurons, the learning rate, and the activation function, as described by M. Z. Alom et al. in "A state-of-the-art survey on deep learning theory and architectures," Electron, vol. 8, no. 3, 2019.

5.3. Long Short-Term Memory (LSTM)

Conventional neural networks are independent of previous state values so that they cannot be used for prediction purposes. Recurrent neural networks (RNN) were developed to handle dynamic systems by adding a feedback path such that the neural networks output become dependent on the previous states. However, gradient vanishing problem in addition to difficulty in processing long sequences limits the RNN performance especially in time-series forecasting problems, as described by M. Abdel-Nasser et al. in "Accurate photovoltaic power forecasting models using deep LSTM-RNN," Neural Comput. Appl., pp. 1-14, 2017.

Figure 38:
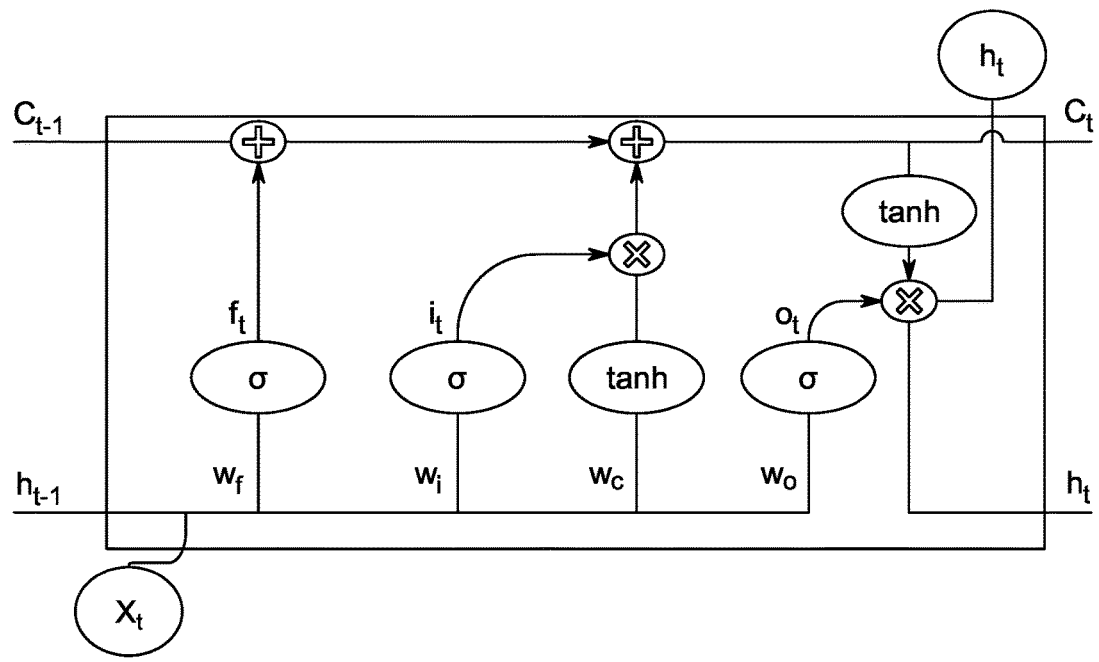
FIG. 38 shows an exemplary long short-term memory block according to some embodiments of the disclosure.

Long short-term memory (LSTM) is developed to solve previously discussed RNN shortcomings with the ability to learn long and short-term dependencies. The LSTM encompasses a series connected memory blocks where each block as depicted in FIG. 38 consists of three gates: a forget gate (f), an input gate (i), and an output gate (o).

Based on the pervious values of the hidden states $h_{t-1}$ and $X_t$. The forget gate evaluates which information of the cell state $C_{t-1}$ to be thrown away. As described by C. Wang et al. in "Long short-term memory neural network (LSTM-NN) enabled accurate optical signal-to-noise ratio (OSNR) monitoring," J. Light. Technol., vol. 37, no. 16, pp. 4140-4146, 2019, the block equation can be written as follows, $$f_t = \sigma(W_f[h_{t-1}, x_t] + b_f) \quad (22)$$

$$i_t = \sigma(W_i[h_{t-1}, x_t] + b_i) \quad (23)$$

$$o_t = \sigma(W_o[h_{t-1}, x_t] + b_o) \quad (24)$$

$$C_t = f_t * C_{t-1} + i_t * \tanh(W_c[h_{t-1}, x_t] + b_i) \quad (25)$$

$$h_t = o_t * \tanh(C_t) \quad (26)$$

where $W_i$, $W_f$, $W_c$, and $W_o$ represent the weight matrices while $b_i$, $b_f$, $b_c$, and $b_o$ denote biases and $\sigma$ is a sigmoid activation function.

Figure 39:
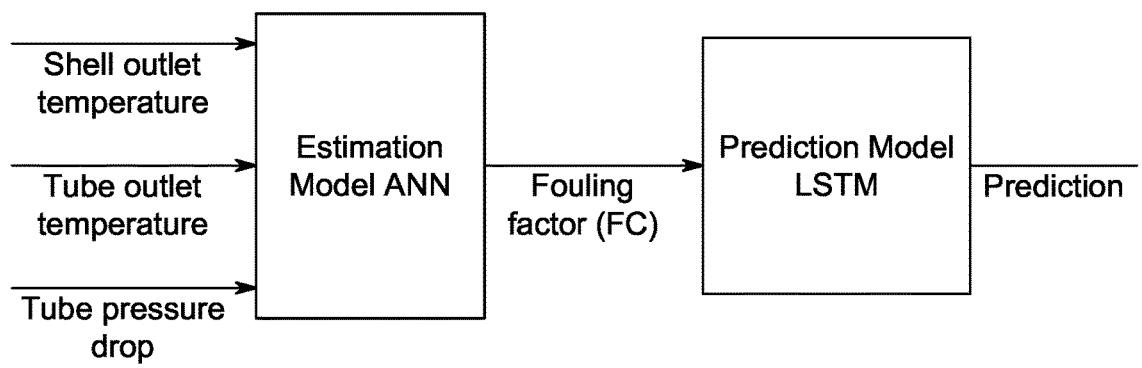
FIG. 39 shows an exemplary model to predict the tube fouling in a shell and tube heat exchanger (STHX) according to some embodiments of the disclosure.

FIG. 39 shows an exemplary model consisting of two blocks to predict the tube fouling in the STHX according to some embodiments of the disclosure. The first block has a feedforward neural network to estimate the fouling while the second block is used to predict the fouling for several time steps ahead.

5.4. Simulation Results

Figure 40:
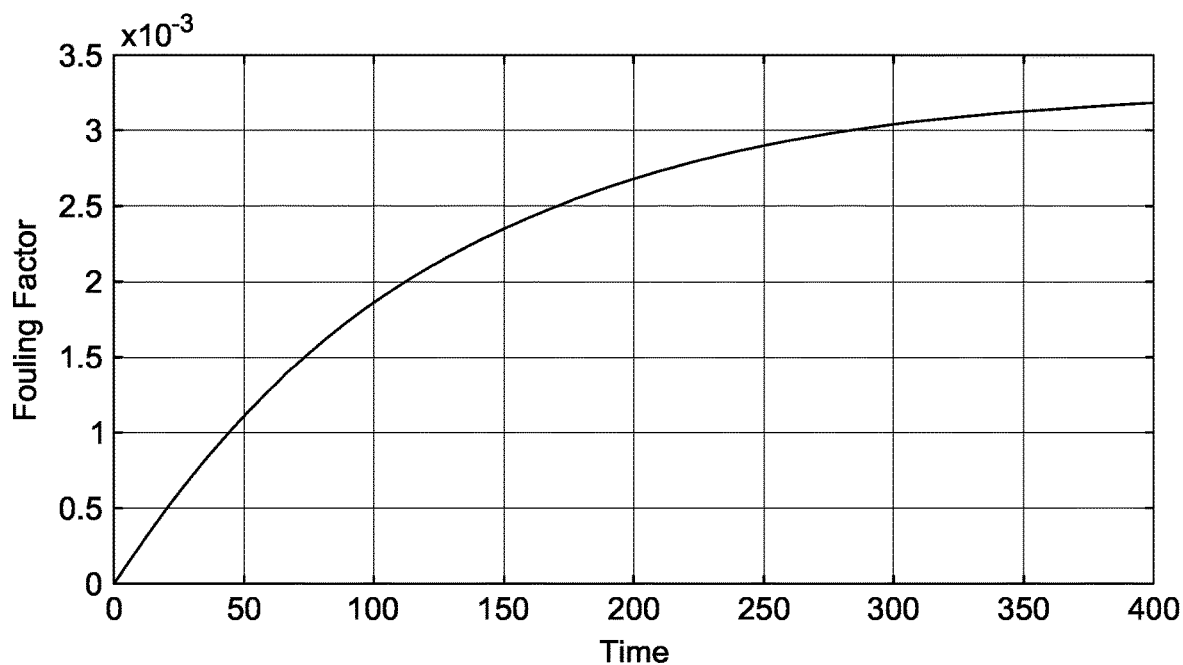
FIG. 40 shows a steady state simulation of the STHX according to some embodiments of the disclosure.

FIG. 40 shows a steady state simulation of the STHX according to some embodiments of the disclosure. The steady state simulation is conducted in the PetroSIM software for an asymptotic fouling regime to get the training data for the fouling estimation and prediction. Water has been used for both the shell and the tube in the simulated STHX.

Table 6 shows the fluids and heat exchanger parameters according to some embodiments of the disclosure.

TABLE 6

| Parameter | Value |
| --- | --- |
| Shell inner diameter | 1.3 m |
| Tuber inner diameter | 21 mm |
| Tube outer diameter | 25 mm |
| Number of Shell Passes | 2 |
| Number of tubes | 1122 |
| Tube Length | 6.1 m |
| Shell fluid inlet temperature | 90° C. |

TABLE 6-continued

| Parameter | Value |
| --- | --- |
| Tube fluid inlet temperature | 30° C. |
| Shell fluid mass flow rate | 6.47 * 10⁸ Kg/h |
| Tube fluid mass flow rate | 1.368 * 10⁶ Kg/h |

MATLAB deep learning toolbox has been adopted to implement the ANN with 20 hidden neurons as depicted in FIG. 37. The tube pressure drop as well as the shell and tube outlet temperatures can be selected as the ANN inputs while the output of the ANN is the fouling factor.

Figure 41:
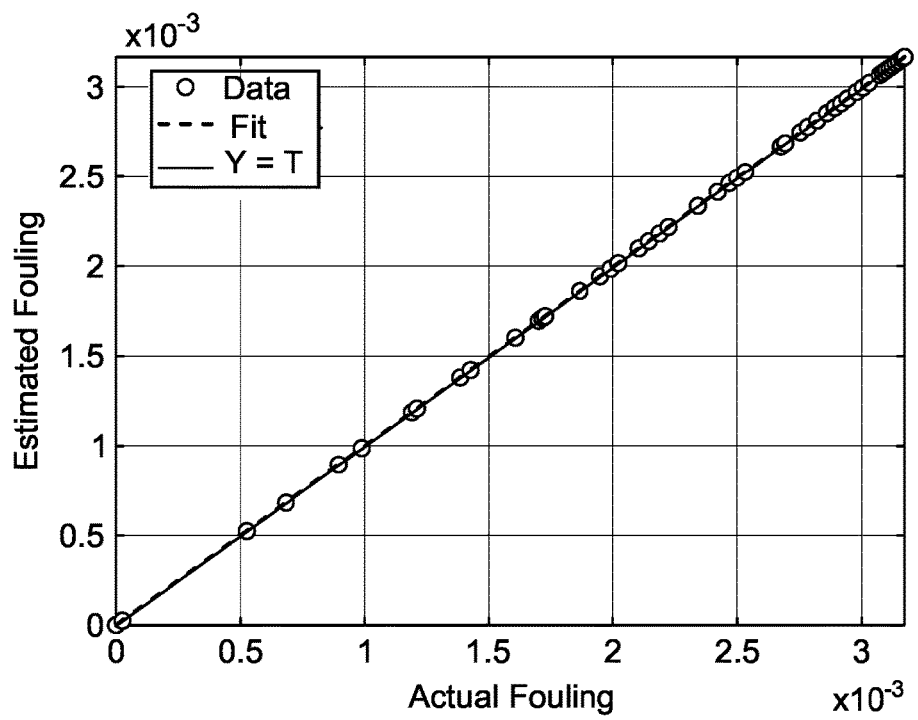
FIG. 41 shows the ANN performance on a test set according to some embodiments of the disclosure.

Prior to training the fouling estimation model, the obtained data was firstly normalized within a range (−1, 1) and then divided into three groups: training, validation, and testing. FIG. 41 shows the ANN performance on a test set according to some embodiments of the disclosure. The test set represents 15% of the total data where a very small error is obtained with MSE=8.5*10⁻¹¹ where MSE is given by Equation 27.

$$MSE = \frac{1}{N}\sum_{k=1}^{N} (\hat{Y}_i - Y_i)^2 \tag{27}$$

where N is the number of data points, $\hat{Y}$ is the estimated value, and Y is the observed value.

Figure 42:
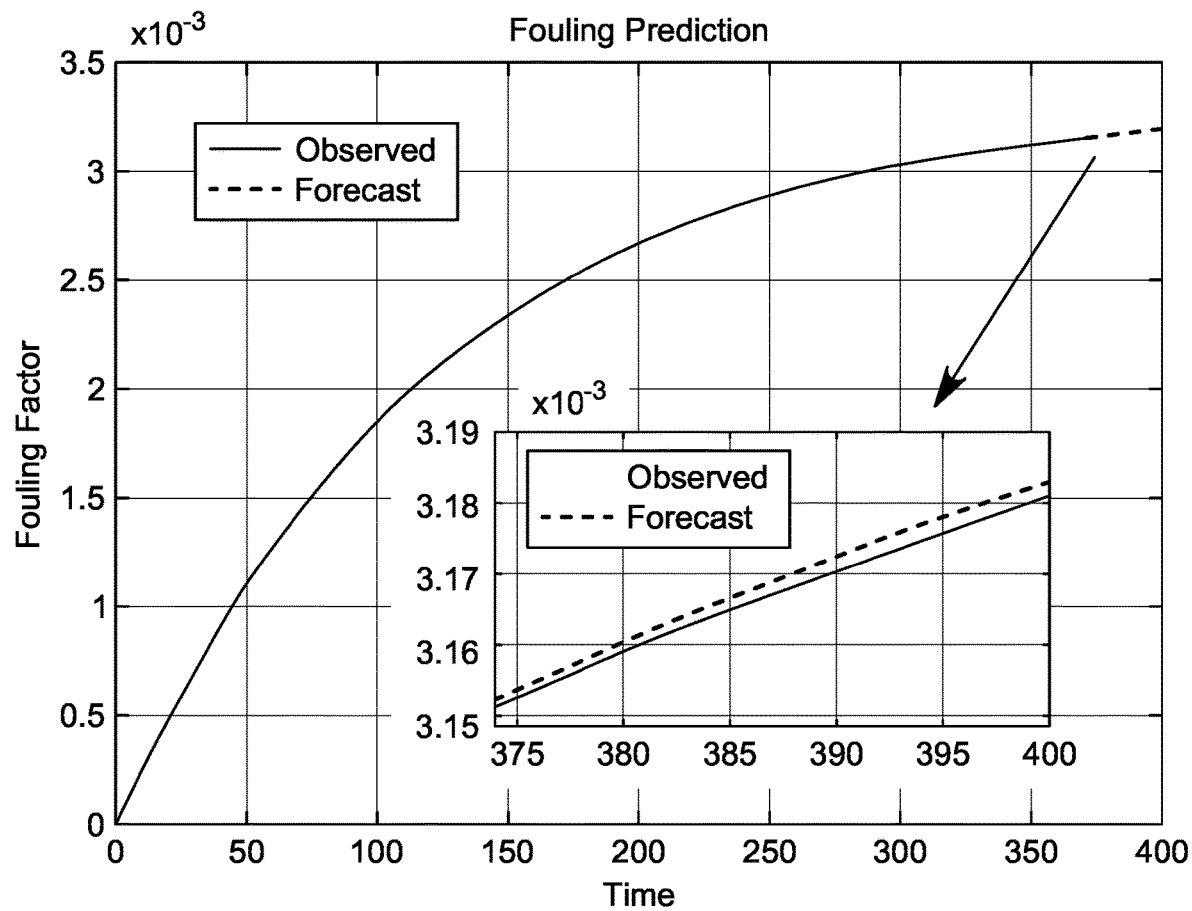
FIG. 42 shows a prediction performance of the fouling factor according to some embodiments of the disclosure.

The estimated fouling factor obtained from the ANN represents the current input to the LSTM which has 20 hidden neurons. The LSTM is trained on the first 93% of the observed data that is obtained from the ANN estimation model. Then, the LSTM is used to predict the remaining 7%. FIG. 42 depicts the prediction performance where the LSTM showed a prediction error RMSE=1.72*10⁻⁶ which represents a small error considering the short term prediction. This performance allows this model to be used for heat exchanger predictive maintenance through providing early alarms about the status of the STHX.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The invention claimed is:

1. A method of controlling a counter flow double pipe heat exchanger (DPHE) that includes a hot fluid pipe and a cold fluid pipe, the method comprising:
determining a temperature error between a reference temperature and a temperature at an outlet of the hot fluid pipe of the counter flow DPHE;
determining a cold fluid mass flow rate from an output of a proportional-integral-derivative (PID) controller based on the temperature error being input to the PID controller, the cold fluid mass flow rate being used for a cold fluid in the cold fluid pipe of the counter flow DPHE; and
controlling the temperature at the outlet of the hot fluid pipe of the counter flow DPHE to maintain the temperature error within a predefined range by utilizing parameters of the PID controller that are set by using a harmony search algorithm (HSA) to obtain a minimization of a cost function.

2. The method of claim 1, wherein the hot fluid pipe and the cold fluid pipe are an inner pipe and an outer pipe of the counter flow DPHE, respectively, wherein the controlling includes controlling an inner pipe fluid outlet temperature of the inner pipe of the counter flow DPHE to maintain the temperature error within the predefined range.

3. The method of claim 1, wherein the parameters of the PID controller include a proportional gain $K_p$, a derivative gain $K_d$, and an integral gain $K_i$.

4. The method of claim 3, wherein $0 \leq K_p \leq 5$, $0 \leq K_d \leq 10$, and $0 \leq K_i \leq 10$.

5. The method of claim 1, wherein the cost function is given by $$\text{cost function} = \frac{1}{N}\sum_{k=1}^{N} k|\epsilon(k)| + 10^3 * \sqrt{\frac{1}{N-1}\sum_{k=1}^{N}(u(k)-\bar{u})^2},$$

wherein N denotes a total number of time samples during the minimization of the cost function, k denotes a time index, $\epsilon$ denotes the temperature error, $u \in [0,2]$ denotes the output of the PID controller, and $\bar{u}$ denotes a mean value of the outputs of the PID controller during the minimization of the cost function.

6. The method of claim 5, wherein the minimization of the cost function includes multiple iterations, wherein each iteration includes:
generating a first plurality of candidate parameters from a second plurality of parameters according to a pitch adjusting rate (PAR) and a harmony memory considering rate (HMCR) of the HSA, the second plurality of parameters being stored in a harmony memory (HM);
determining whether a result of the cost function based on a subset of the first plurality of candidate parameters is less than a result of the cost function based on a subset of the second plurality of parameters;
in response to a determination that the result of the cost function based on the subset of the first plurality of candidate parameters is less than the result of the cost function based on the subset of the second plurality of parameters,
replacing the subset of the second plurality of parameters with the subset of the first plurality of candidate parameters in the HM; and
in response to a determination that the result of the cost function based on the subset of the first plurality of candidate parameters is not less than the result of the cost function based on the subset of the second plurality of parameters,
removing the subset of the first plurality of candidate parameters.

7. The method of claim 6, wherein the PAR is given by $x_{new}=x_{old}+FW\cdot\epsilon$, wherein $x_{old}$ denotes a current pitch, FW is a fret width, $\epsilon \in (0,1]$ is a random number, and $x_{new}$ denotes an adjusted pitch.

8. The method of claim 7, wherein $$FW(i) = FW_{max}\exp\left(\ln\left(\frac{FW_{min}}{FW_{max}}\right)*\frac{i}{NI}\right),$$

wherein $FW_{max}$ denotes a maximum fret width, $FW_{min}$ denotes a minimum fret width, NI is a total number of iterations, and i is a current iteration number.

9. A heat exchanging system, comprising:
a counter flow double pipe heat exchanger (DPHE) configured to perform a heat exchanging process between a hot fluid in a hot fluid pipe and a cold fluid in a cold fluid pipe; and
a proportional-integral-derivative (PID) controller configured to:
receive a temperature error between a reference temperature and a temperature at an outlet of the hot fluid pipe of the counter flow DPHE,
output a cold fluid mass flow rate for the cold fluid in the cold fluid pipe of the counter flow DPHE based on the received temperature error, and
control the temperature at the outlet of the hot fluid pipe of the counter flow DPHE to maintain the temperature error within a predefined range by utilizing parameters of the PID controller that are set by using a harmony search algorithm (HSA) to obtain a minimization of a cost function.

10. The heat exchanging system of claim 9, wherein the hot fluid pipe and the cold fluid pipe are an inner pipe and an outer pipe of the counter flow DPHE, respectively, and the PID controller is configured to control an inner pipe fluid outlet temperature of the inner pipe of the counter flow DPHE to maintain the temperature error within the predefined range.

11. The heat exchanging system of claim 9, wherein the parameters of the PID controller include a proportional gain $K_p$, a derivative gain $K_d$, and an integral gain $K_i$.

12. The heat exchanging system of claim 11, wherein $0 \leq K_p \leq 5$, $0 \leq K_d \leq 10$, and $0 \leq K_i \leq 10$.

13. The heat exchanging system of claim 9, wherein the cost function is given by $$\text{cost function} = \frac{1}{N}\sum_{k=1}^{N} k|\epsilon(k)| + 10^3 * \sqrt{\frac{1}{N-1}\sum_{k=1}^{N}(u(k)-\mu)^2},$$

wherein N denotes a total number of time samples during the minimization of the cost function, k denotes a time index, $\epsilon$ denotes the temperature error, $u \in [0,2]$ denotes the output of the PID controller, and $\mu$ denotes a mean value of the outputs of the PID controller during the minimization of the cost function.

14. The heat exchanging system of claim 13, wherein the minimization of the cost function includes multiple iterations, wherein each iteration includes:
generating a first plurality of candidate parameters from a second plurality of parameters according to a pitch adjusting rate (PAR) and a harmony memory considering rate (HMCR) of the HSA, the second plurality of parameters being stored in a harmony memory (HM);
determining whether a result of the cost function based on a subset of the first plurality of candidate parameters is less than a result of the cost function based on a subset of the second plurality of parameters;
in response to a determination that the result of the cost function based on the subset of the first plurality of candidate parameters is less than the result of the cost function based on the subset of the second plurality of parameters,
replacing the subset of the second plurality of parameters with the subset of the first plurality of candidate parameters in the HM; and
in response to a determination that the result of the cost function based on the subset of the first plurality of candidate parameters is not less than the result of the cost function based on the subset of the second plurality of parameters,
removing the subset of the first plurality of candidate parameters.

15. The heat exchanging system of claim 14, wherein the PAR is given by $x_{new} = x_{old} + FW \cdot \epsilon$, wherein $x_{old}$ denotes a current pitch, FW is a fret width, $\epsilon \in (0,1]$ is a random number, and $x_{new}$ denotes an adjusted pitch.

16. The heat exchanging system of claim 15, wherein $$FW(i) = FW_{max}\exp\left(\ln\left(\frac{FW_{min}}{FW_{max}}\right) * \frac{i}{NI}\right),$$

wherein $FW_{max}$ denotes a maximum fret width, $FW_{min}$ denotes a minimum fret width, NI is a total number of the iterations, and i is a current iteration number.

17. A method of controlling a counter flow double pipe heat exchanger (DPHE) that includes a hot fluid pipe and a cold fluid pipe, the method comprising:
determining a temperature error between a reference temperature and a temperature at an outlet of the hot fluid pipe of the counter flow DPHE;
determining a change rate of the temperature error;
determining a cold fluid mass flow rate from an output of a fuzzy proportional-integral-derivative (PID) controller based on the temperature error and the change rate of the temperature error being input to the fuzzy PID controller, the cold fluid mass flow rate being used for a cold fluid in the cold fluid pipe of the counter flow DPHE; and
controlling the temperature at the outlet of the hot fluid pipe of the counter flow DPHE within a predefined range by utilizing parameters of the fuzzy PID controller that are set by using a harmony search algorithm (HSA) to obtain a minimization of a cost function.

18. The method of claim 17, wherein the output of the fuzzy PID controller is limited by a function given by $$\Psi(u) = \begin{cases} 2, & u > 2 \\ u, & 0 \leq u \leq 2, \\ 0, & u < 0 \end{cases}$$

wherein u denotes the output of the fuzzy PID controller.

19. A heat exchanging system, comprising:
a counter flow double pipe heat exchanger (DPHE) configured to perform a heat exchanging process between a hot fluid in a hot fluid pipe and a cold fluid in a cold fluid pipe; and
a fuzzy proportional-integral-derivative (PID) controller configured to:
receive (i) a temperature error between a reference temperature and a temperature at an outlet of the hot fluid pipe of the counter flow DPHE and (ii) a change rate of the temperature error,
output a cold fluid mass flow rate for the cold fluid in the cold fluid pipe of the counter flow DPHE, and
control the temperature at the outlet of the hot fluid pipe of the counter flow DPHE within a predefined range by utilizing parameters of the fuzzy PID controller that are set by using a harmony search algorithm (HSA) to obtain a minimization of a cost function.

20. The heat exchanging system of claim 19, wherein the output of the fuzzy PID controller is limited by a function given by $$\Psi(u) = \begin{cases} 2, & u > 2 \\ u, & 0 \le u \le 2, \\ 0, & u < 0 \end{cases}$$

wherein u denotes the output of the fuzzy PID controller.

* * * * *